(12) United States Patent
Ziv et al.

(10) Patent No.: US 11,297,468 B2
(45) Date of Patent: Apr. 5, 2022

(54) EFFICIENT MULTICAST GROUP ROUTING ACROSS TREE-BASED WIRELESS NETWORK

(71) Applicants: Pinchas Ziv, Rosh Haain (IL); Reuven Cohen, Rosh Haain (IL); Eran Ben-Shmuel, Rosh Haain (IL); Alexander Bilchinsky, Rosh Haain (IL)

(72) Inventors: Pinchas Ziv, Rosh Haain (IL); Reuven Cohen, Rosh Haain (IL); Eran Ben-Shmuel, Rosh Haain (IL); Alexander Bilchinsky, Rosh Haain (IL)

(73) Assignee: JUGANU, LTD., Rosh Haain (IL)

( * ) Notice: Subject to any disclaimer, the term of this patent is extended or adjusted under 35 U.S.C. 154(b) by 137 days.

(21) Appl. No.: 16/677,825

(22) Filed: Nov. 8, 2019

(65) Prior Publication Data
US 2020/0162856 A1 May 21, 2020

Related U.S. Application Data

(60) Provisional application No. 62/757,185, filed on Nov. 8, 2018.

(51) Int. Cl.
*H04H 20/71* (2008.01)
*H04W 4/08* (2009.01)
*H04L 12/18* (2006.01)

(52) U.S. Cl.
CPC .............. *H04W 4/08* (2013.01); *H04L 12/189* (2013.01)

(58) Field of Classification Search
CPC ......... H04W 4/08; H04W 40/32; H04W 4/06; H04L 12/189; H04L 45/16; H04L 45/48; H04L 45/34; H04L 12/1854

USPC .......................................................... 370/312
See application file for complete search history.

(56) References Cited

U.S. PATENT DOCUMENTS

| | | | |
|---|---|---|---|
| 7,590,116 B2 | 9/2009 | He et al. | |
| 8,009,671 B2 | 8/2011 | Dong et al. | |
| 8,289,883 B2 | 10/2012 | Ngo et al. | |
| 9,497,034 B2 | 11/2016 | Chen et al. | |
| 2004/0010616 A1 | 1/2004 | McCanne | |
| 2007/0168555 A1* | 7/2007 | Dorenbosch ...... | H04L 29/06027 709/245 |
| 2008/0095163 A1 | 4/2008 | Chen et al. | |

(Continued)

OTHER PUBLICATIONS

International Search Report and Written Opinion Corresponding to International Application No. PCT/IB2019/001244 dated Mar. 23, 2020, 15 pages.

*Primary Examiner* — Chuong T Ho
(74) *Attorney, Agent, or Firm* — Morgan, Lewis & Bockius LLP

(57) ABSTRACT

Approaches for multicast routing a group packet that includes a payload and routing information (e.g., a target identifier vector and a target multicast group ID) in a network having multiple cells each comprising a parent node and one or more child nodes include establishing and storing one or more child-node multicast group map tables associated with the child node(s) for each cell; receiving a multicast group packet; determining whether to forward the multicast group packet to the child node(s) based at least in part on the child-node multicast group map table(s) associated therewith and the received target identifier vector; and if so, causing the parent node to forward the multicast group packet to the child node(s).

20 Claims, 13 Drawing Sheets

(56) References Cited

U.S. PATENT DOCUMENTS

| | | | | |
|---|---|---|---|---|
| 2018/0287935 A1* | 10/2018 | Wang | .................. | H04L 12/4633 |
| 2019/0165961 A1* | 5/2019 | Bartier | .................... | H04L 45/16 |
| 2019/0165962 A1* | 5/2019 | Bartier | .................... | H04L 45/04 |
| 2019/0165964 A1* | 5/2019 | Bartier | .................... | H04L 69/26 |
| 2020/0014550 A1* | 1/2020 | Xu | ....................... | H04L 61/2069 |
| 2020/0099543 A1* | 3/2020 | Taylor | .................. | H04L 12/189 |
| 2020/0366512 A1* | 11/2020 | Wijnands | ................ | H04L 12/18 |

* cited by examiner

EFFICIENT MULTICAST GROUP ROUTING ACROSS TREE-BASED WIRELESS NETWORK

CROSS-REFERENCE TO RELATED APPLICATION

This application claims priority to and the benefit of U.S. Provisional Application No. 62/757,185, filed on Nov. 8, 2018, the entire disclosure of which is hereby incorporated by reference.

TECHNICAL FIELD

The present invention relates generally to tree-based wireless networks, and in various embodiments more specifically to efficient multicast routing in such networks.

BACKGROUND

Recent developments of Internet and mobile communication technologies provide diverse multimedia services, which may be provided almost instantaneously over vast distances. The proliferation of compact portable electronic devices such as notebook computers, mobile phones and smart devices have necessitated deployment of such services, which tend to be very data-intensive, over wireless networks.

One commonly used wireless network has a tree-based structure. This network architecture is often deployed in device networks organized or governed by controllers. For example, tree-based wireless networks are often used when a controller controls a group of network members (or "nodes"); each group member will be reachable via a path across the wireless tree, enabling a point-to-multipoint communication (P2MP) (such as from the controller to the nodes) and multipoint-to-point communication (MP2P) (such as from the nodes to the controller). Common applications include controlled lighting systems, city-wide automatic meter-reading system etc.

Typically, a network group includes a collection of network nodes that share a certain capability, and a network node may belong to more than one group. For example, the first network group may include all network nodes equipped with sensors for measuring air quality near the nodes, and the second group may include network nodes equipped with streetlight controllers of a specific type. A network node equipped with both the air-quality sensor and the particular streetlight controller may thus belong to both the first and second groups.

The wireless network may use various random-access algorithms to access the wireless channels. For example, a carrier-sense multiple access with collision avoidance (CSMA/CA) algorithm may be used to access a radio channel for packet delivery (in accordance with, e.g., the IEEE 802.15.4 and 802.11 standards). Generally, the heavier the load on the channel, the more challenging it will be to "acquire" the channel for packet delivery, thereby increasing communication delay and reducing the throughput performance of the wireless network. In addition, the spurious energy from the heavily used channel may "leak" to the adjacent channels and reduce their signal-to-noise ratio, thereby degrading performance. Thus, it is desirable to minimize the load on wireless channels as well as the number of wireless transmissions in order to keep the channels as "clean" as possible.

Conventional approaches for root-originated group packet delivery in a tree network, however, are generally inefficient and may cause heavy loads on the wireless channels. For example, referring to FIG. 1A, one conventional approach for delivering a packet containing a target group identifier and packet payload from a tree root to a target group is to "flood" the entire tree and broadcast the packet to all nodes thereon. Each node, upon receipt of the broadcast packet, may re-broadcast the received multicast message, compare its group identifiers with that of the received packet, and process the received packet payload in the event of a match to the packet's group identifiers. But because the broadcasts are not acknowledged, some messages may not reach the target group. In addition, the radio channel may be heavily used across the tree network, i.e., the entire geographical area covered by the tree. Even when a group is collectively located in a specific geographical area and covered by only several nodes, the multicast message is still unnecessarily broadcast across all tree nodes.

Another conventional approach for multicast delivery of a packet from the tree root to the target group is by individual unicasting. For example, referring to FIG. 1B, the root may generate (or receive from a network management system) a unicast message containing a target multicast group identifier. All nodes along the path to the target node deliver the message as a unicast message with acknowledgement. As a result, the probability that the message will reach the target node is higher than with non-acknowledged delivery via broadcasting. In addition, the radio channel is heavily used only by the nodes that are on the paths to the target nodes. But this approach has its own inefficiencies. A node (e.g., node 102 as depicted) that is on the path to several sub-trees containing the target group member must transmit the packet multiple times, each time for another unicast that propagates on a different path from the root to the target node. For example, the node 102 depicted in FIG. 1B has to deliver two separate unicast messages to the nodes 104 and 106 via the paths 108, 110, respectively.

Another conventional approach combines unicasting and broadcasting for multicast delivery of a packet from the tree root to the target group. For example, referring to FIG. 1C, the multicast delivery may be performed via unicasting followed by broadcasting. As depicted, the root node 112 first delivers the message to the "first" node 114 via unicasting; subsequently, the node 114 broadcasts the message to the sub-trees 116, 118 containing the target group members there below. As used herein, the term "first node" refers to the node that receives messages via unicasting. To improve delivery efficiency and reliability, the root node 112 may identify and unicast the message to multiple nodes, which then broadcast the message. For example, as depicted in FIG. 1C, a multicast message can be delivered to node 120 via broadcasting and then to node 122 via unicasting. Although utilization of several "first" nodes may increase the message delivery reliability, it also causes a repeated unicast message delivery across a path that splits into several sub-trees containing, at certain depths, one or more members of the target group. In addition, because the sub-tree delivery still utilizes broadcasting, the reliability of message delivery is worse than that of individual unicasting.

Thus, conventional schemes for wireless, root-originated group packet delivery have drawbacks, including inefficient and unreliable delivery as well as causing heavy loads on the wireless channels. Consequently, there is a need for approaches that can improve the delivery efficiency and reliability of multicast messages and reduce burdens on the wireless channels.

SUMMARY

Various embodiments of the present invention relate to efficient and reliable multicast routing of a group packet in a tree-based wireless network by minimizing wireless transmissions, thereby reducing the loads on the wireless channels. In various embodiments, the group packet includes a payload and routing information (such as a target bit identifier vector and a target multicast group ID). In addition, in each node of the network, a parent-node multicast group map (MGM) table associated with the node (i.e., parent node) and one or more child-node MGM tables associated with the child node(s) of the parent node may be established and stored in memory accessible to a network management system (NMS). The parent-node MGM table and child-node MGM tables may include information, such as one or more identifiers (IDs) associated with the multicast group(s) in which the parent/child node(s) is a member and/or a bit identifier vector(s) for pointing to the bit(s) in the parent-node/child-node MGM tables representing the supporting group ID(s). In various embodiments, upon receipt of a multicast group packet, the parent node retrieves information stored in the parent-node MGM table and/or child-node MGM tables based on routing information in the group packet; the parent node can then determine whether to forward the multicast group packet to any of its child nodes based on the retrieved information. Accordingly, the multicast routing traffic described herein does not reach network nodes that neither contain the target group members nor are a transit node on the path to the target group node(s). As a result, the duration and the number of packet transmissions from the parent nodes to their associated child nodes across the wireless network may be minimized (or at least reduced relative to conventional routing schemes), thereby decreasing the bandwidth consumption and interference. This may significantly increase the overall throughput, reduce the delay performance of the network, and reduce the likelihood of a "punctured" packet due to bit hits, thereby maintaining "clean air" in the wireless channels. In addition, because the group packet is no longer required to include the complete, explicit route required in some conventional routing approaches, embodiments of the invention described herein may advantageously save bandwidth as well as allow for a larger payload in each delivery.

Accordingly, in one aspect, the invention pertains to a method of multicast routing a group packet in a network including multiple cells, each supporting communication among multiple transceiver nodes therein and being capable of receiving and transmitting group packets, each cell including a parent node and one or more child nodes, each group packet including routing information and a payload. In various embodiments, the method includes (a) for each cell, establishing and storing one or more child-node multicast group map tables associated with the child node(s), each of the child-node multicast group map table(s) including (i) an ID associated with at least one multicast group in which the cell is a member and (ii) at least one identifier vector for identifying the multicast group ID in the child-node multicast group map table; (b) receiving a multicast group packet whose routing information includes a target identifier vector and a target multicast group ID; (c) determining whether to forward the multicast group packet to the child node(s) based at least in part on the child-node multicast group map table(s) associated therewith and the received target identifier vector; and (d) if so, causing the parent node to forward the multicast group packet to the child node(s). In one implementation, the identifier vector points to a bit in the child-node multicast group map table and step (c) includes determining whether the bit pointed to by the received target identifier vector is set to a non-zero value, and if so, causing the parent node to forward the multicast group packet to the child node(s).

The method may further include establishing and storing a parent-node multicast group map table associated with the parent node, the parent-node multicast group map table including (i) an ID associated with each multicast group IDs supported by all of the child node(s) of the parent node and subtrees associated therewith and (ii) at least one identifier vector merging the identifier vectors associated with all of the child node(s) of the parent node. In one embodiment, the parent-node multicast group map table is established by applying a bitwise OR operation on the child-node multicast group map table(s) of the child nodes of the parent node. In addition, the child-node multicast group map table(s) may have a size corresponding to a maximum number of the multicast group supported by the network.

In some embodiments, the forwarding step includes forwarding, by the parent node, the multicast group packet to the child node(s) in a broadcasting or multiple unicasting manner. In addition, the method may further include determining a number of the child nodes to which the multicast group packet is forwarded. In one embodiment, the method further includes causing the parent node to forward the multicast group packet in a broadcasting manner if the number of the child nodes to which the multicast group packet is forwarded exceeds one. In addition, the method may further include causing the parent node to forward the multicast group packet in a unicasting manner if the multicast group packet is forwarded to a single child node. In various embodiments, the method further includes determining whether the target multicast group ID associated with the group packet matches the multicast group ID in the child-node multicast group map table(s); and if so, causing the group packet to be transferred to a higher stack layer within the child node(s).

In another aspect, the invention relates to a network system for multicast routing a group packet in a network including multiple cells, each supporting communication among multiple transceiver nodes therein and being capable of receiving and transmitting group packets, each cell including a parent node and one or more child nodes, each group packet including routing information and a payload. In various embodiments, the system includes memory for storing one or more child-node multicast group map tables associated with the child node(s), each of the child-node multicast group map table(s) including (i) an ID associated with at least one multicast group and (ii) at least one identifier vector for identifying the multicast group ID in the child-node multicast group map table; and multiple network management systems associated with the network system and each of the transceiver nodes. In one implementation, the network management system associated with the network system is configured to receive a multicast group packet whose routing information includes a target identifier vector and a target multicast group ID; and the network management system associated with each of the nodes is configured to (i) determine whether to forward the multicast group packet to the child node(s) based at least in part on the child-node multicast group map table(s) associated therewith and the received target identifier vector; and (ii) if so, cause the parent node to forward the multicast group packet to the child node(s). In one embodiment, the identifier vector points to a bit in the child-node multicast group map table and the network management system associated with each node is further configured to determine whether the bit pointed to by the received target identifier vector is set to a non-zero value, and if so, cause the parent node to forward the multicast group packet to the one or more child nodes.

The network management system associated with each node may be further configured to establish a parent-node multicast group map table associated with the parent node, the parent-node multicast group map table including (i) an ID associated with each multicast group IDs supported by all of the child node(s) of the parent node and subtrees associated therewith and (ii) at least one identifier vector merging the identifier vectors associated with all of the child node(s) of the parent node; and store the parent-node multicast group map in the memory. In addition, the network management system associated with each node may be further configured to establish the parent-node multicast group map table by applying a bitwise OR operation on the child-node multicast group map table(s) of the child nodes of the parent node. The child-node multicast group map table(s) may have a size corresponding to a maximum number of the multicast group supported by the network.

In some embodiments, the network management system associated with each node is further configured to forward, by the parent node, the multicast group packet to the child node(s) in a broadcasting or multiple unicasting manner. In addition, the network management system associated with each node is further configured to determine a number of the child nodes to which the multicast group packet is forwarded. In one embodiment, the network management system associated with each node is further configured to cause the parent node to forward the multicast group packet in a broadcasting manner if the number of the child nodes to which the multicast group packet is forwarded exceeds one. In addition, the network management system associated with each node is further configured to cause the parent node to forward the multicast group packet in a unicasting manner if the multicast group packet is forwarded to a single child node. In some embodiments, the network management system associated with each node is further configured to determine whether the target multicast group ID associated with the group packet matches the multicast group ID in the child-node multicast group map table(s); and if so, cause the group packet to be transferred to a higher stack layer within the child node(s).

As used herein, the terms "approximately," "roughly," and "substantially" mean±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Multicast Routing a Group Packet in a Tree-Based Wireless Network

Figure 1A:
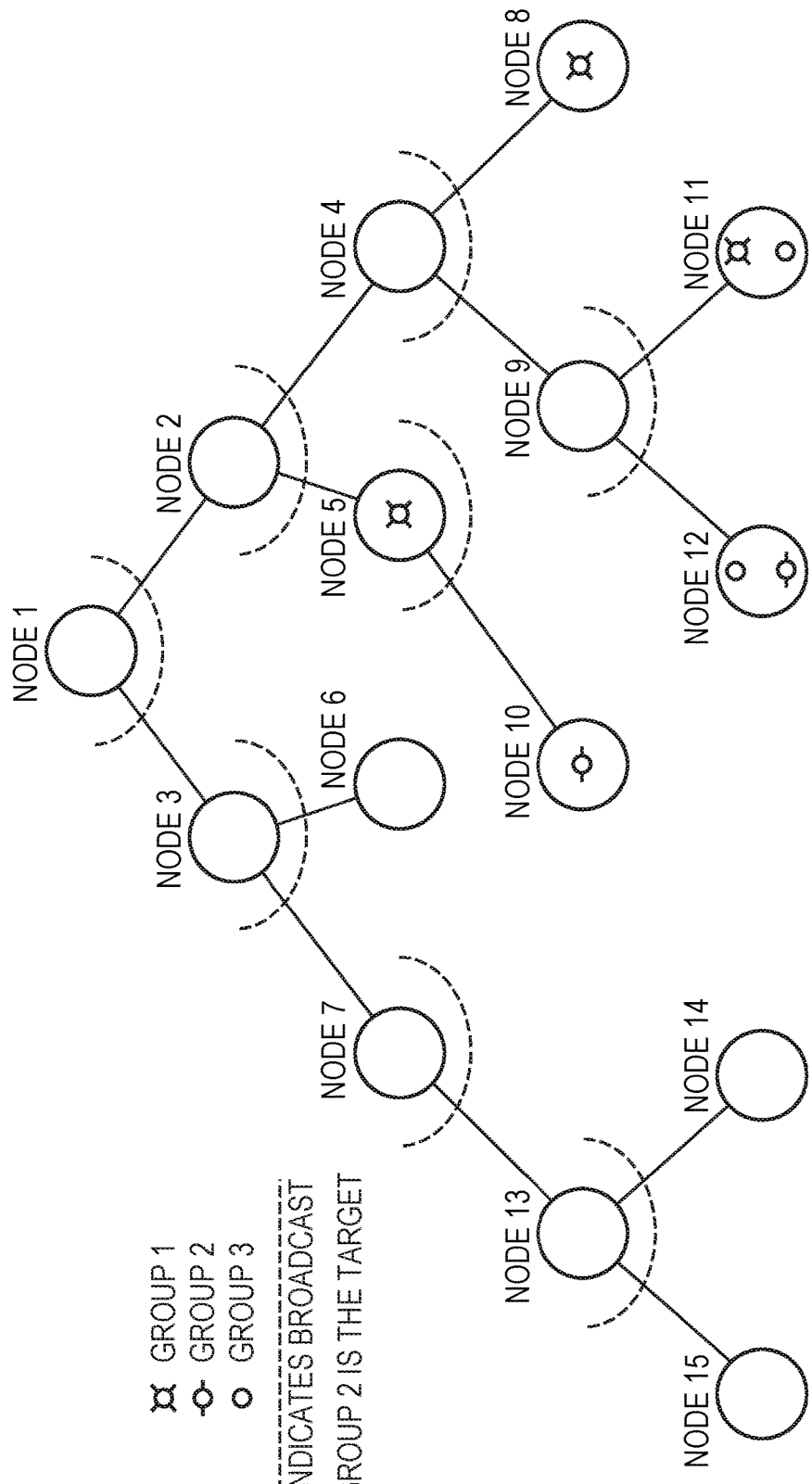
FIGS. 1A-1C depict various conventional approaches for multicast delivery of a packet from a root node to a target group of nodes in a tree-based wireless network.
Figure 1B:
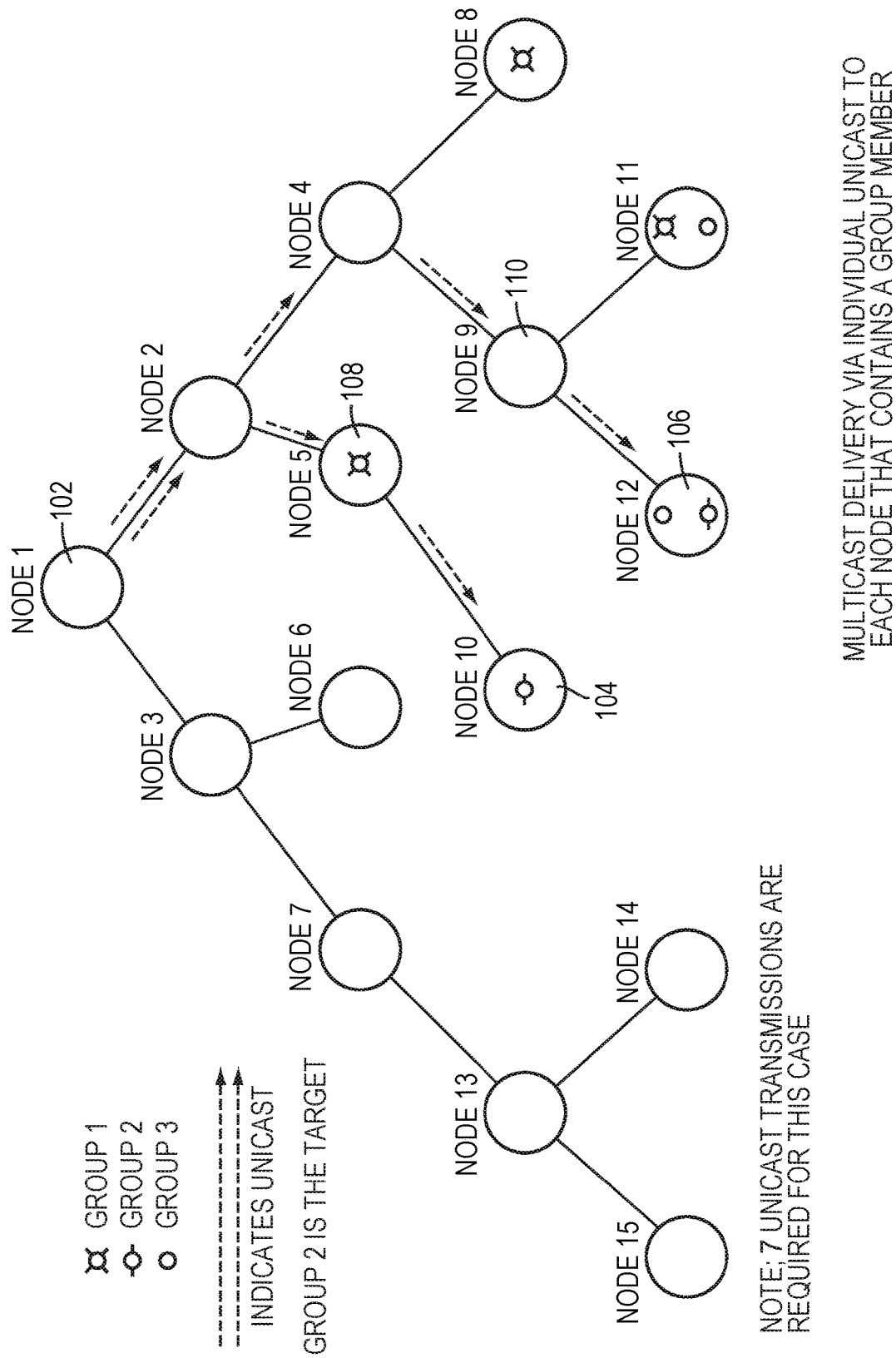
Figure 1C:
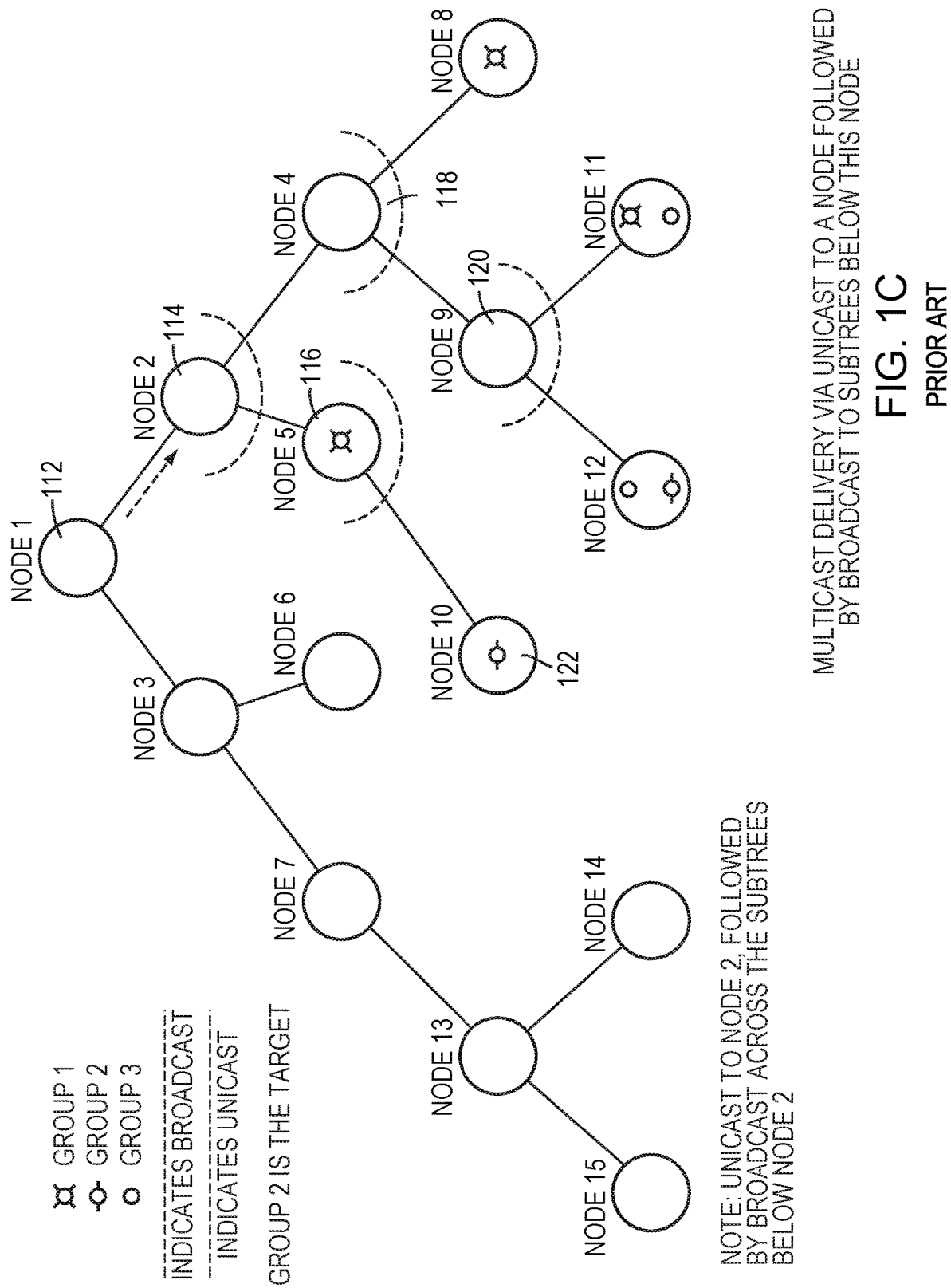
Figure 2:
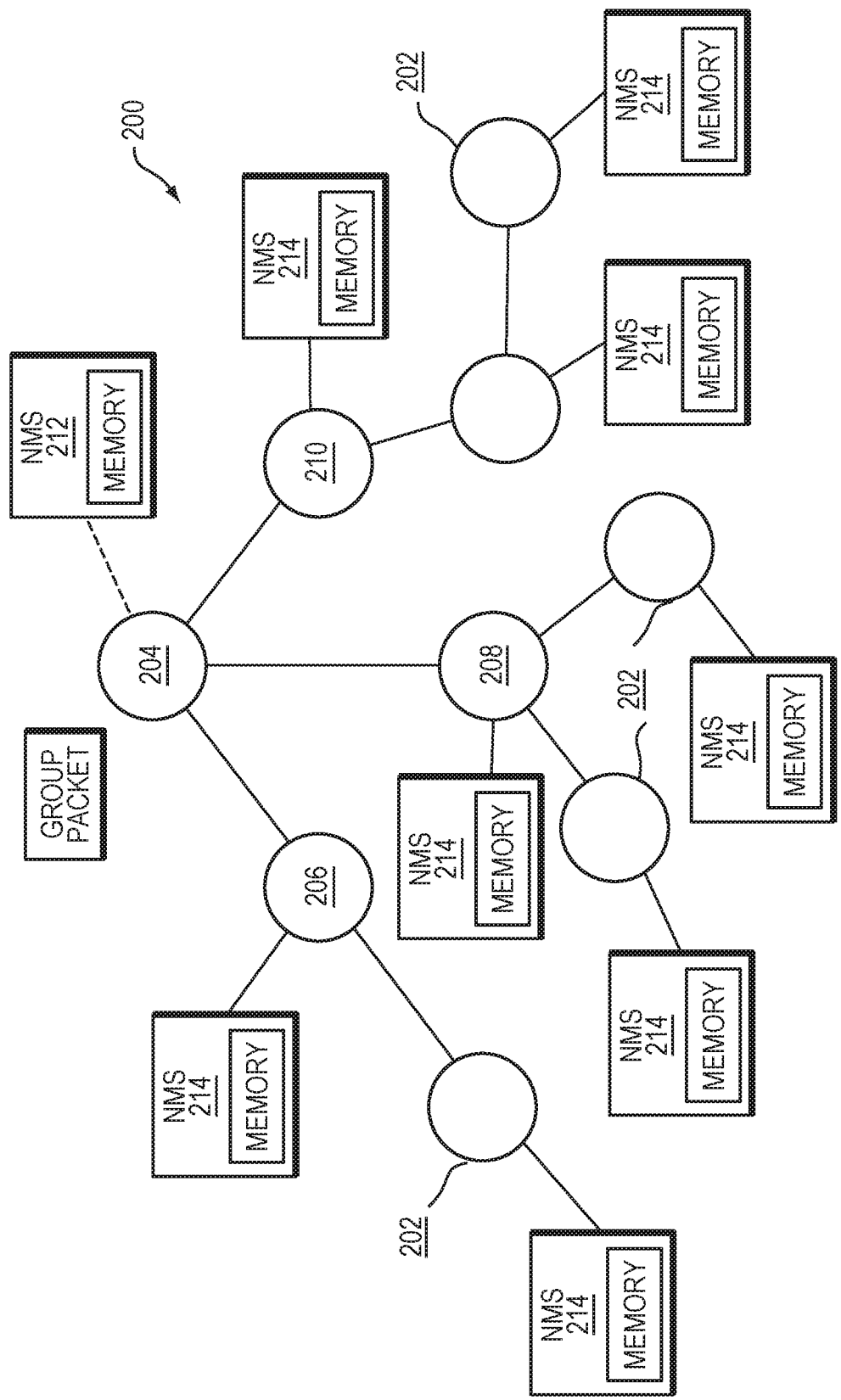
FIG. 2 conceptually illustrates an exemplary tree-based wireless network having multiple network nodes for multicast routing messages in accordance with various embodiments.

FIG. 2 conceptually illustrates an exemplary tree-based wireless network 200 comprising multiple network nodes 202, each including one parent node and one child node, for multicast routing of messages such as group packets across the network 200 in accordance herewith; each group packet may include a payload (e.g., a data packet) and routing information (such as target bit identifier vectors, target multicast group IDs, etc.) as further described below.

Each network node 202 is a member of a transceiver "cell," i.e., a discrete geographic region having fixed-location transceivers on, for example, lighting poles. A transceiver cell typically includes a "parent" node (e.g., node 204) and one or more child nodes (e.g., nodes 206-210). In addition, each of the parent and child nodes may include one transceiver. The parent node is the "owner" of the cell node(s); a child node may be associated with only one parent node at a time. In one embodiment, the child nodes connect to their parent nodes via a "wireless tree branch." The child node(s) in a cell are within the radio transmission range of the parent node and vice versa. Typically, the parent node and its child nodes are within a one-hop distance from each other. In each cell, a data packet can be delivered in a "downlinked" manner—i.e., from the parent node to its child node(s) (e.g., using broadcasting to all child nodes or unicasting to a specific child node) and/or in an "uplinked" manner—i.e., from a child node to its associated parent node using, for example, unicasting. If the data packet received by the child node does not originate from its associated parent node, the child node may discard the data packet. Similarly, if the data packet received by the parent node does not originate from one of its associated child nodes, the parent node may discard the data packet.

In various embodiments, each node acts as both a parent node (defined herein as "DL") and a child node (defined herein as "UL"). The DL node is an entity contained in a node that acts as a cell parent; and the other cell members are child nodes of the parent node located one hop away from the DL node. Similarly, the UL node is an entity contained in a node and is a cell member "owned" by a DL parent in another node (e.g., one-hop distance away that acts as the parent).

The tree-based wireless network 200 may be constructed dynamically using one or more conventional protocols and algorithms. In one embodiment, the network 200 is constructed as a spanning tree that interconnects each network node via a unique path to the tree root node. The same path may connect the tree root node to a network node. In some embodiments, the network 200 is constructed as multiple spanning trees with appropriate identifiers per tree; each tree (and thereby its associated identifier) supports a unique path between the tree root node and a network node on that tree. Thus, a downlink data packet that "originates" from the tree root node (or a network management system) may traverse a path across the tree that includes a collection of the network nodes wirelessly interconnected from the parent node of one network node to a child node within the parent's cell (i.e., one hop away). The destination network node can be reached via multiple hops. For a given tree, the path from the root node to the target node is always the same; in other words, the path acts as a "virtual circuit" for a data packet to be delivered from the root node to a target node. The virtual circuit may maintain the in-order delivery of packets, but does not guarantee that all delivered packets will reach the destination. Similarly, an uplink message may be delivered from a node to the root node via traversing a path therebetween. For example, assuming that nodes X, Y, Z are along the path from the node originating the message to the tree root node, the message may propagate in the uplink manner along the wireless branches—i.e., from the originating node UL (e.g., a child contained within node X) to its associated DL (e.g., the parent contained within node Y), then internally propagate from the receiving DL to the UL contained within the same node (e.g., node Y), then propagate further up to the DL (e.g., contained within node Z) associated with the UL within node Y, and so on.

In various embodiments, each node contains two radio transceivers: one used by the parent within the node to send and/or receive data packets from the associated child node(s) and the other used by a child node within the node to send and/or receive data packets from the associated parent in another node. In addition, the tree structure may enable (i) each network node to deliver an uplink message directed to the tree root node (using e.g., MP2P) via a path determined by the tree structure, and (ii) the root node to deliver a downlink unicast message to a selected node (using e.g., P2MP) via a path determined by the tree structure.

In addition, a collection of network nodes that have the same capability (e.g., equipped with a specific type of streetlight controller) may form a group. Each network node may be a member of (and thereby support) one or more groups. For example, a node may be a member of a citywide sensor group and a member of a group corresponding to a specific type of street lighting controller. The group members may be distributed across the tree structure in any fashion. For example, the group members may be concentrated in a geographical area (e.g., light controllers distributed in a specific neighborhood) or may be distributed citywide (e.g., air-quality sensors distributed across a city). In addition, the geographical location of one group may or may not overlap with that of another group. The tree-based network 200 can (but need not necessarily) be optimized for a certain group delivery. In one embodiment, the tree-based network 200 is constructed with various optimization rules without considering the possible group distributions.

In various embodiments, the delivered message is a "short" message that can be contained in one packet, and each packet is delivered and processed as soon as the packet is received by a node. To allow for multicast message delivery, each node may include a database storing one or more group identifiers (IDs) associated with the group(s) it is a member of. A multicast message may be propagated "down" the tree to a single target group ID. In addition, the child node may accept only messages transmitted from its associated parent. When the root node broadcasts a message, the message received by the receiving node(s) may be re-broadcast without acknowledgement. When the root node unicasts a message to a target node, however, each receiving node on the propagation path may acknowledge the unicasting.

In various embodiments, a network management system (NMS) 212 is employed in the wireless tree network 200. The NMS 212 may control one or more gateways that act as tree root nodes to the tree-based network. In addition, the NMS 212 may generate a message (e.g., a group packet) to the tree root(s) which then transmits the message to a specific network node or to a group of network nodes. In addition, the NMS 212 may be equipped with memory having a database to store information associated with the tree root nodes, network nodes and groups reachable via the corresponding tree roots. In some embodiments, each node in the network 200 includes an individual network management system 214 for performing various functions, such as multicast routing a group packet in the network, adding a multicast group ID to the network, removing a multicast group ID from the network, associating a node with a new parent node, de-associating a node from its parent node, etc. as further described below. The NMS 212/214 may include or consist essentially of a computing device, e.g., a server, which executes various program modules to perform methods in accordance with embodiments of the present invention. In addition, the memory may include or consist essentially of one or more volatile or non-volatile storage devices, e.g., random-access memory (RAM) devices such as DRAM, SRAM, etc., read-only memory (ROM) devices, magnetic disks, optical disks, flash memory devices, and/or other solid-state memory devices.

Figure 3:
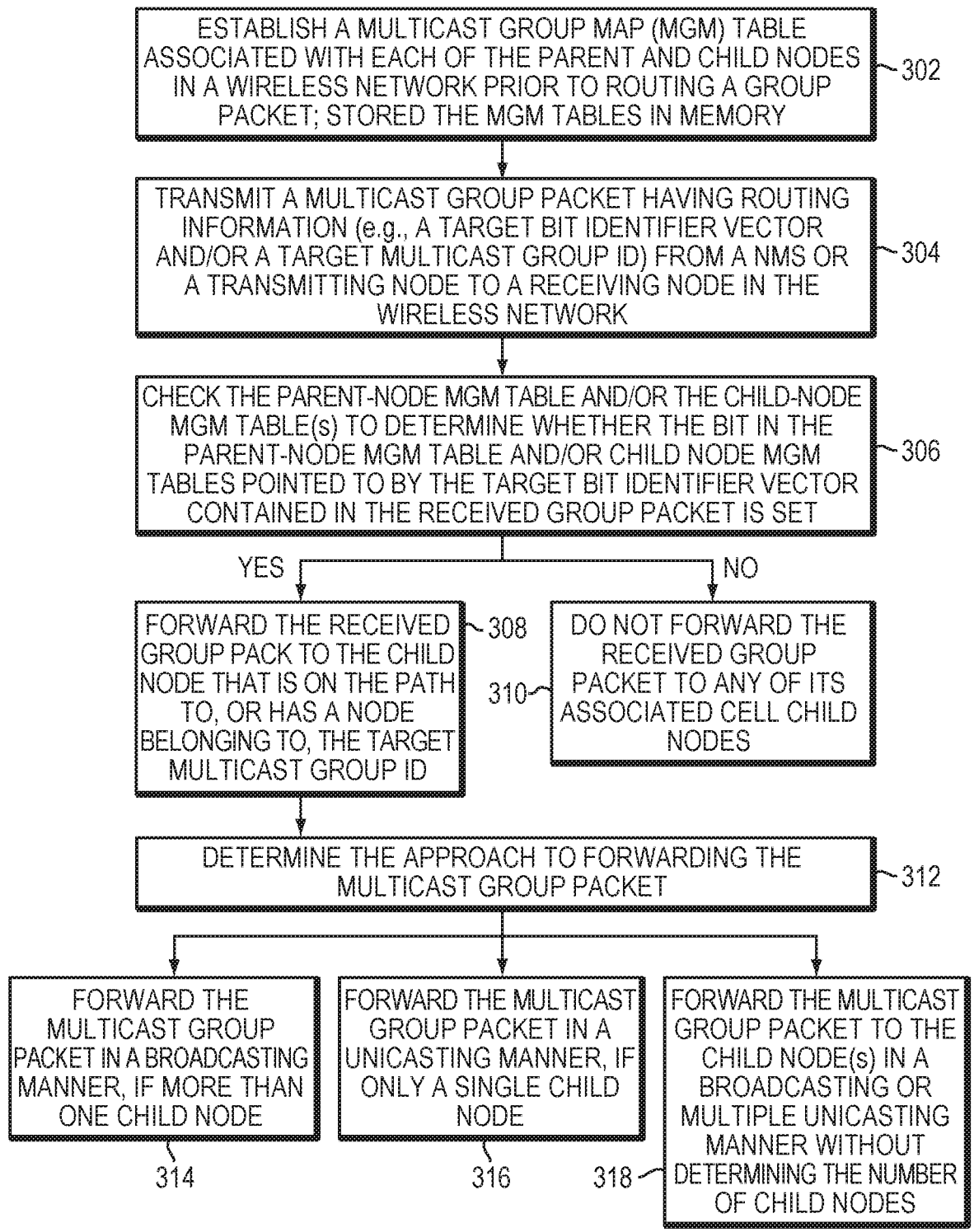
FIG. 3 is a flow chart illustrating an exemplary approach for multicast routing a group packet in a tree-based wireless network in accordance with various embodiments.
Figure 4:
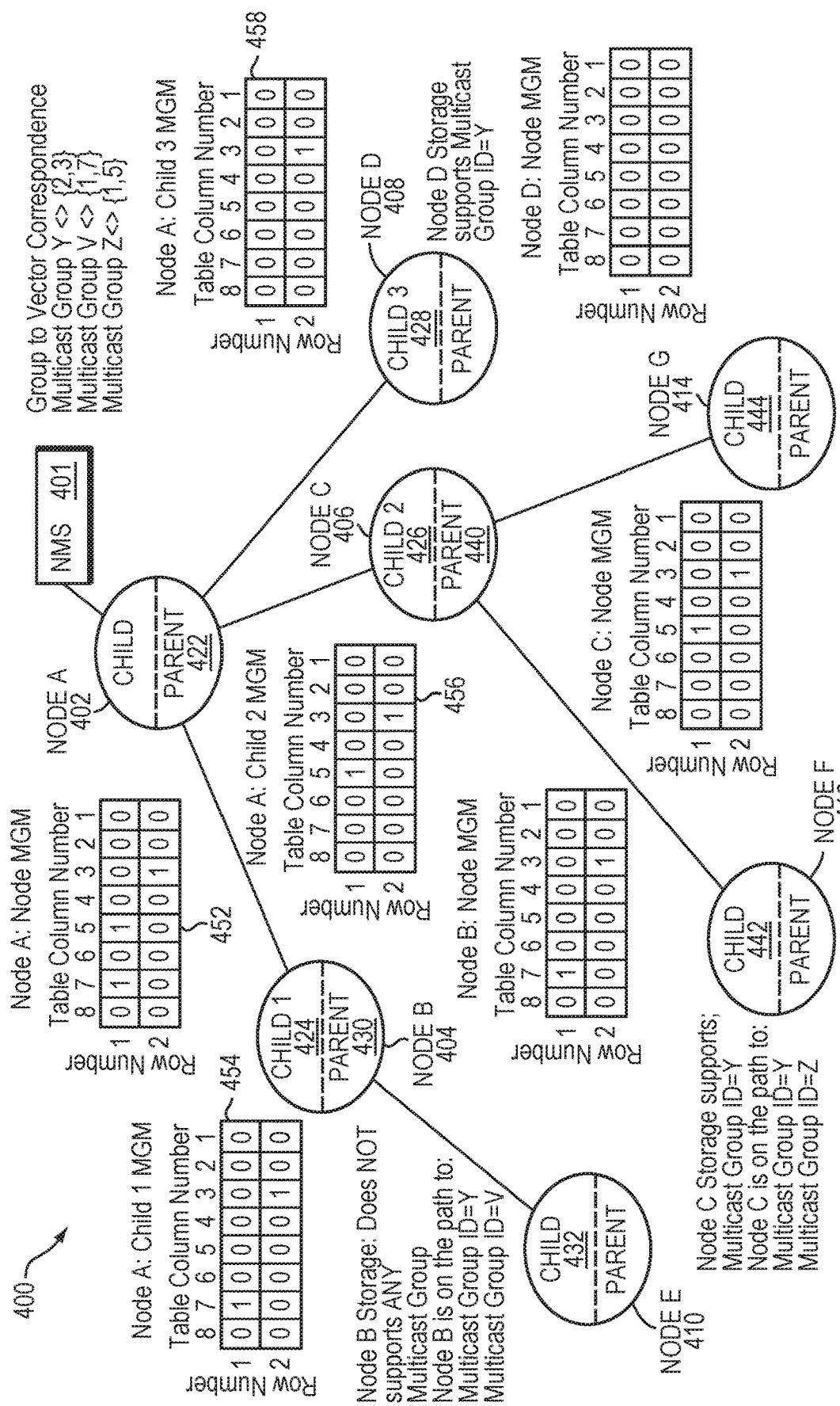
FIG. 4 illustrates a tree-based wireless network having multiple network nodes, each including a parent-node MGM table and one or more child-node MGM tables in accordance with various embodiments.

FIG. 3 illustrates an exemplary approach 300 for multicast routing a group packet in a tree-based wireless network including multiple network nodes. FIG. 4 illustrates a tree-based wireless network 400 including network nodes 402-414, each of which itself includes a parent node and one or more child nodes. In various embodiments, each parent node either broadcasts or unicasts the multicast group packet to its associated child node(s) in another network node(s). For example, the parent node 422 in the network node 402 may broadcast or unicast the multicast group packet to its associated child nodes 424, 426, 428 in the network node 404, 406, 408, respectively; the parent node 430 in the network node 404 may broadcast or unicast the multicast group packet to its associated child node 432 in the network node 410; and the parent node 440 in the network node 406 may broadcast or unicast the multicast group packet to its associated child nodes 442, 444 in the network nodes 412, 414, respectively.

Referring again to FIG. 3, in various embodiments, prior to routing the group packet in the network, a multicast group map (MGM) table associated with each of the parent and child nodes is established and stored in memory that can be accessed by the NMS 212/214 (step 302). The size of each MGM table equals the maximum number of multicast groups that can be supported by the network. For example, referring to FIG. 4, the network node 402 may include a parent-node MGM table 452 corresponding to the parent node 422 and child-node MGM tables 454, 456, 458 corresponding to its associated child nodes 404, 406, 408, respectively. In one embodiment, each child-node MGM table includes one or more IDs associated with the network group(s) of which the network node is a member and one or more bit identifier vectors. The group ID(s) are represented using a bit map having one or more bits assigned by the NMS 212/214; and the bit identifier vector(s) point to the bit(s) in the child-node MGM table representing the supported multicast group ID(s). Similarly, each parent-node MGM table may include a bit map having one or more bits corresponding to one or more IDs associated with the multicast group(s) supported by all of the associated child nodes and the subtrees associated therewith. In addition, the parent-node MGM table may include one or more bit identifier vectors merging the bit identifier vectors associated with all of its associated child nodes. In one implementation, the bit identifier vector(s) in the parent-node MGM table is obtained by applying a bitwise OR operation on the contents of the child-node MGM tables associated with all the child nodes associated therewith.

In the parent-node MGM table, when the value in a bit position is set with a non-zero value (or "SET," for ease of reference herein), the path to the target multicast group ID includes one of this node's child nodes. Similarly, when a value in a bit position of a child-node MGM table is SET (i.e., has a non-zero value), the path to the target multicast group ID includes the child node. Because several child nodes may be on the paths to the target multicast group ID, the corresponding bit positions in the child-node MGM tables can all be SET. It should be noted that if a bit in the parent-node or child-node MGM Table is SET, this does not necessarily mean that this parent/child node supports the corresponding multicast group; rather, it merely means that this parent/child node is on the path to the corresponding multicast group ID.

In a "leaf" node (i.e., a node having no child nodes), the content of all bits in the parent-node MGM table and the child-node MGM tables (if exist) is set with the zero value (or "CLEAR," for ease of reference herein). Again, this does not necessarily mean that the leaf node supports any multicast group ID. In case that the leaf node supports one or more multicast group IDs, a list of the multicast group IDs supported by the node may be stored in a database associated therewith.

In addition, it should be noted that the NMS 212/214 may create the child-node MGM tables during node initialization or dynamically when the child node is associated with its parent node. Further, the child node may change its associated parent node. When this occurs, the NMS 212/214 may change the child-node MGM table, the prior parent's parent-node MGM table, the new parent's parent-node MGM table and/or the gateway(s) involving the child node. In addition, the NMS 212/214 may add or delete multicast group processes as further described below for updating the multicast group IDs associated with the child node, prior parent node and/or new parent node.

Refer again to FIG. 4, which depicts exemplary parent-node MGM table 452 and child-node MGM tables 454-458. As shown, the network 400 may support up to 16 multicast groups. Each of the parent-node MGM table and child-node MGM tables stored in the database associated with the node 402 is represented by two bytes (e.g., byte 1 followed by byte 2 as depicted); each byte has eight bits, 1-8. In addition, the bit identifier vector is represented by {"row number," "column number"} in the table. In this example, the row number and column number are represented in the decimal values. Note that for the binary representation, four bits may be necessary for presentation of the bit identifier. Based on the parent-node MGM table 452 stored in the node 402, the node 402, which is a parent node of the child nodes 404-408, is on the paths to (i) a multicast group having an ID=Y with a bit identifier vector={2,3}, (ii) a multicast group having an ID=Z with a bit identifier vector={1,5}, and (iii) multicast group having an ID=V with a bit identifier vector={1,7}. Similarly, based on the child-node MGM tables 454-458 stored in the node 402, the node 404 is on the paths to (i) the multicast group having the ID=Y with the bit identifier vector={2,3} and (ii) the multicast group having the ID=V with the bit identifier vector={1,7}; the node 406 is on the paths to (i) the multicast group having the ID=Y with the bit identifier vector={2,3} and (ii) the multicast group having the ID=Z with the bit identifier vector={1,5}; and the node 408 is a "leaf node" having no child nodes and supporting the multicast group having the ID=Y with the bit identifier vector={2,3}.

Referring again to FIG. 3, in a second step 304, the NMS 212 may cause a multicast group packet having routing information (such as a target bit identifier vector and/or a target multicast group ID) to be delivered from the NMS 212 or a transmitting node (e.g., root node) to a receiving node in the wireless network. For example, as shown in FIG. 4, the NMS 212 may transmit a group packet to the node 402. Upon receiving the group packet, the receiving node (e.g., node 402) may check the content of the parent-node MGM table and/or the child-node MGM table(s) stored in the database associated therewith to determine whether the bit in the parent-node MGM table and/or child-node MGM tables pointed to by the target bit identifier vector contained in the received group packet is SET (i.e., has a non-zero value) (in a third step 306). If so, at least one of the child nodes (e.g., nodes 404-408) associated with this parent node (e.g., node 402) is on the path to the target multicast group having the ID identified in the routing information of the received group packet, and the parent node (e.g., node 402) may contain at least one subtree that has a node belonging to the target multicast group ID. Subsequently, the receiving node (e.g., node 402) may forward the received group packet to the child node that is on the path to, or has a node belonging to, the target multicast group ID as further described below (step 308). If, however, the bit in the parent-node MGM table and/or child-node MGM tables pointed to by the target bit identifier vector is CLEAR (i.e., has a value of zero), the group packet has reached the target group ID. In other words, this receiving node (e.g., node 402) is a "multicast group leaf node" for the target multicast group ID, and no child nodes associated with the receiving node have subtrees that support the target multicast group ID. As a result, the receiving node may not forward the received group packet to any of its associated cell child nodes (step 310).

After the receiving parent node (e.g., node 402) determines that one or more of the subtrees of its associated child nodes contain the target multicast group ID, the receiving parent node (e.g., node 402) may determine the approach to forwarding the multicast group packet; this may be based on, for example, the number of child nodes to which the multicast group packet is forwarded (step 312). In some embodiments, when the number of the child nodes to which the multicast group packet is forwarded exceeds one, the parent node may forward the multicast group packet in a broadcasting manner (step 314). When the multicast group packet is forwarded to a single child node only, the parent node may forward the multicast group packet in a unicasting manner (step 316). In one implementation, the receiving parent node transmits the multicast group packet to the child node(s) using broadcasting or multiple unicasting. Whether broadcasting or multiple unicasting is used may depend on the distributed fashion of the nodes traversed by the multicast group packet. Alternatively, the receiving parent node (e.g., node 402) may forward the multicast group packet to the child node(s) in a broadcasting or multiple unicasting manner without determining the number of child nodes to which the multicast group packet is forwarded (step 318).

Figure 5:
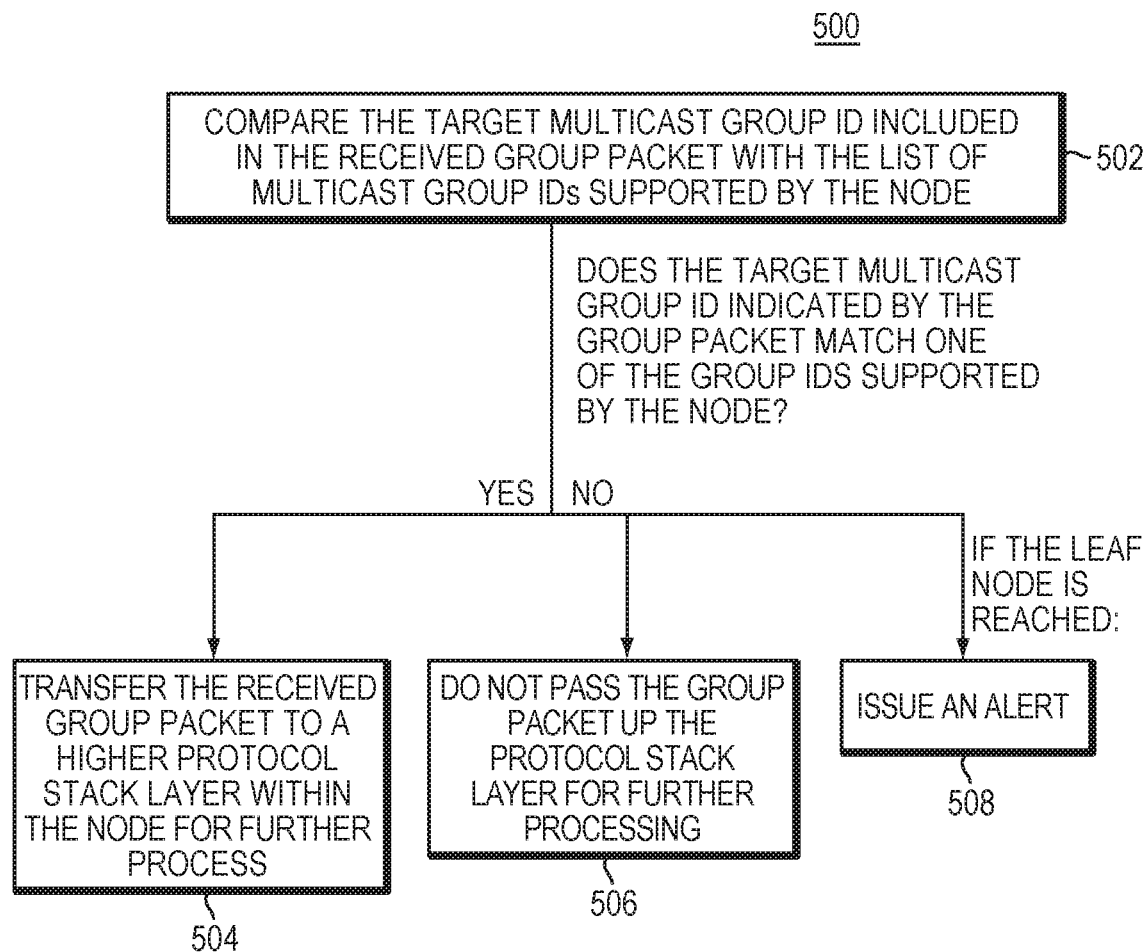
FIG. 5 illustrates an exemplary approach for processing a received group packet in a network node in accordance with various embodiments.

FIG. 5 illustrates an exemplary approach 500 for processing a received group packet in a network node in accordance herewith. In various embodiments, after the group packet is received by the leaf node and/or the child node(s), the leaf node and/or the child node(s) may compare the target multicast group ID included in the received group packet with the list of multicast group IDs supported by the node (step 502). If the target multicast group ID indicated by the group packet matches one of the group IDs supported by the node, the node may transfer the received group packet to a higher protocol stack layer within the node for further processing (step 504). If, however, the received target multicast group ID does not match any of the group IDs supported by the node, the group packet is not passed up the protocol stack layer for further processing (step 506). When the group packet reaches a leaf node, the leaf node should support the indicated multicast group ID; otherwise a multicast routing error has occurred. The error may result from an error in the MGM tables in one or more of the preceding network nodes on the path to the receiving node. If such a routing error occurs, the leaf node may be configured to issue an alert to the NMS 212 (step 508).

Accordingly, various embodiments of the present invention reliably and efficiently route a multicast group packet in a tree-based wireless network by establishing and storing parent-node and/or child-node MGM tables in each node and including the routing information (such as a target bit identifier vector and a target multicast group ID) in the delivered group packet. The parent-node and/or child-node MGM tables include information such as the ID(s) associated with the multicast group(s) in which the parent/child node(s) is a member and the bit identifier vector(s) for pointing to the bit(s) in the child-node MGM table(s) representing the supporting group ID(s). These approaches advantageously obviate the need to include a complete, explicit route in the group packet as is required in various conventional routing approaches.

In addition, because the multicast routing traffic described herein does not reach the network nodes that neither contain the target group members nor are transit nodes on the path to the target group node(s), the duration and the number of packet transmissions from the parent nodes to their associated child nodes across the wireless network may be minimized (or at least reduced relative to conventional approaches). This may advantageously decrease bandwidth consumption and interference, significantly increase the overall throughput and reduce the delay performance of the network as well as the likelihood of a punctured packet due to bit hits.

Adding a Multicast Group ID to a Network

The NMS 212 generally maintains a database storing information, such as the gateway that is the root for a selected network node, the multicast group ID(s) supported by the selected network node, the bit identifier vector(s) corresponding to the supporting multicast group ID(s), etc. In addition, the NMS 212 may search and modify information in the database when necessary. In various embodiments, the NMS 212 can add a new multicast group ID to the wireless network it controls. The NMS 212 may first identify a gateway that supports the new multicast group ID to be added and then perform the following procedures to add the new multicast group ID to (i) a node, (ii) all nodes rooted to the identified gateway, and (iii) all network nodes in all gateways of the wireless network.

1) Adding a Multicast Group ID to a Node

Figure 6A:
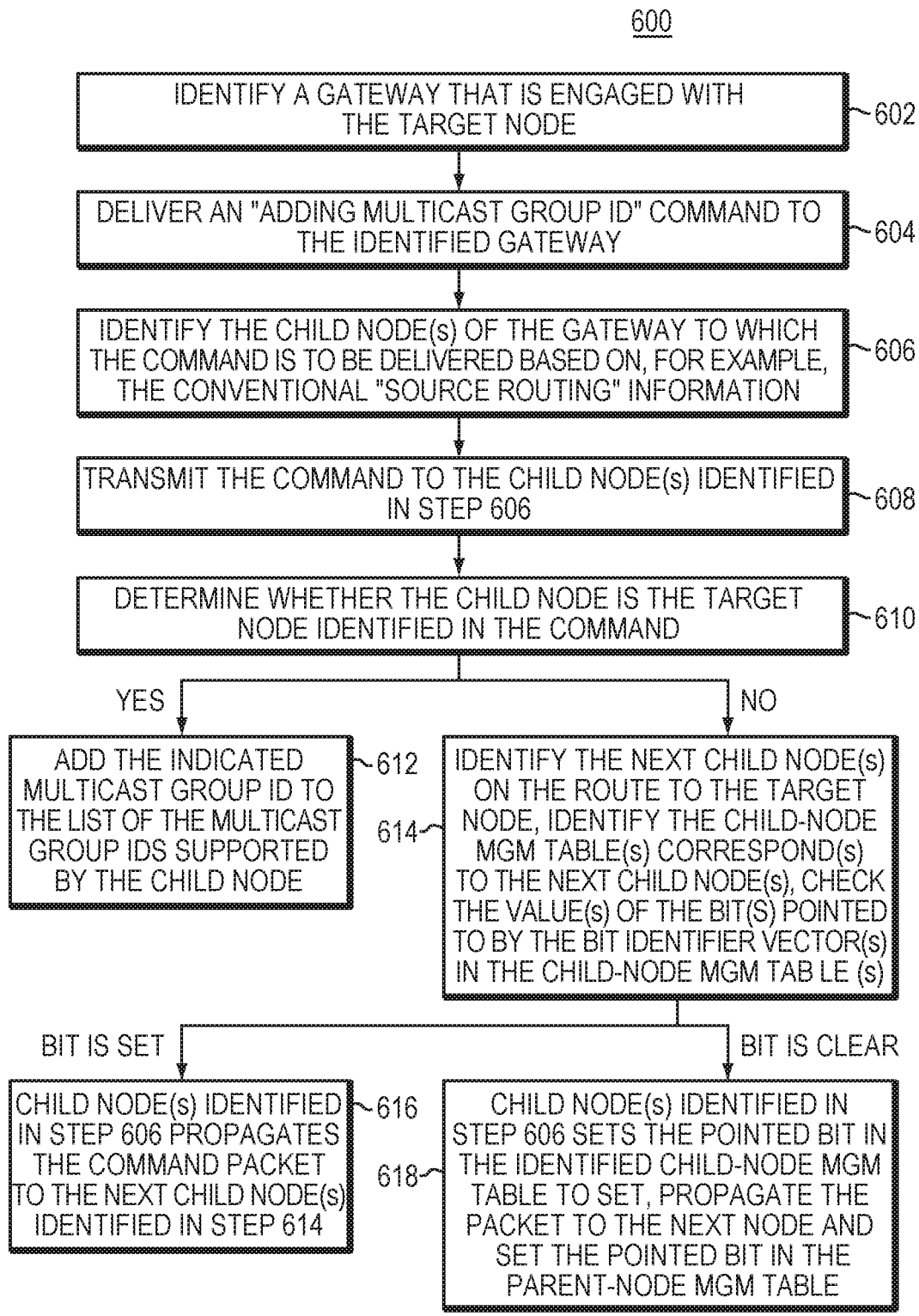
FIG. 6A is a flow chart illustrating an exemplary approach for adding a new multicast group ID to a target network node in accordance with various embodiments.

FIG. 6A illustrates an exemplary approach 600 for adding a new multicast group ID to a target network node for supporting the new multicast group ID in accordance herewith. Typically, the command is initiated by the NMS 212 and directed to the target node. In a first step 602, the NMS 212 identifies a gateway that is the root for the target node. In a second step 604, the NMS 212 delivers an "adding multicast group ID" command to the identified gateway. The command may include the pair information {bit identifier vector, multicast group ID} as well as the route to the target node. In a third step 606, the gateway identifies the child node(s) of the gateway to which the command is to be delivered based on, for example, the conventional "source routing" information. In a fourth step 608, the gateway then transmits the command to the child node(s) identified in step 606. In a fifth step 610, upon receipt of the command, the child node determines whether it is itself the target node identified in the command. If so, the child node may add the indicated multicast group ID to the list of the multicast group IDs supported thereby (step 612). If the node is not the target node, the child node may identify the next child node(s) on the route to the target node (using, for example, source routing information contained in the received command), identify the child-node MGM table(s) corresponding to the next child node(s), check the value(s) of the bit(s) pointed to by the bit identifier vector(s) in the child-node MGM table(s) (step 614). If the bit is SET, the child node(s) identified in step 606 propagates the command packet to the next child node(s) identified in step 614 using, for example, source routing procedures (step 616). If, however, the pointed-to bit value is CLEAR, the child node(s) identified in step 606 may (i) set the pointed-to bit in the identified child-node MGM table to be a non-zero value (i.e., "SET") and propagate the packet to the next node on the path to the target node using conventional source routing procedures and (ii) set the pointed-to bit in the parent-node MGM table to a non-zero value (step 618). Steps 614-618 may be iteratively performed until the command packet reaches the target node (identified according to source routing procedures). In one embodiment, after the target node is reached, step 612 may be performed. In various embodiments, the NMS 212 may add the new multicast group ID to one or more nodes selected based on criteria such as geographical locations.

2) Adding a Multicast Group ID to all Nodes Rooted to an Identified Gateway

Figure 6B:
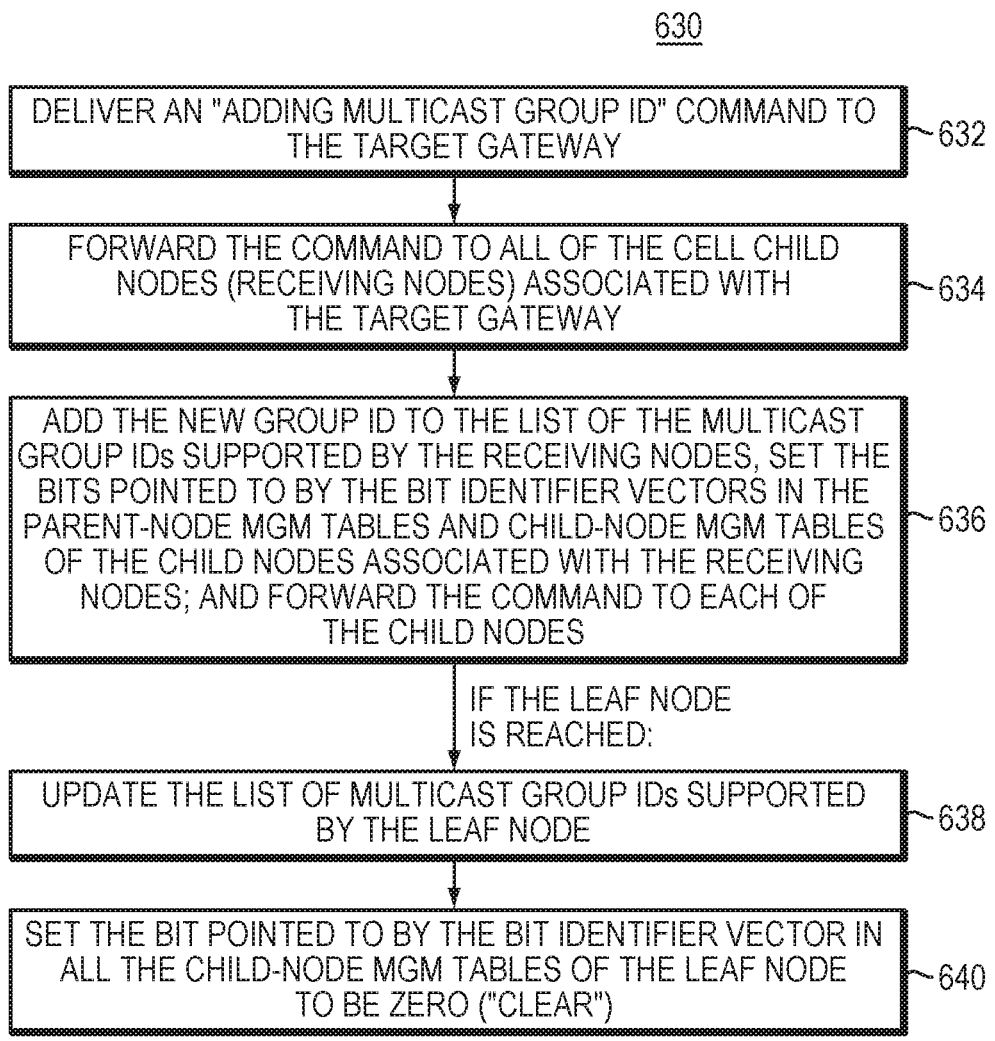
FIG. 6B is a flow chart illustrating an exemplary approach for adding a new multicast group ID to all nodes controlled by a target gateway in accordance with various embodiments.

FIG. 6B illustrates an exemplary approach 630 for adding a new multicast group ID to all the nodes controlled by a target gateway so that the nodes become members of the new multicast group. In a first step 632, the NMS 212 delivers an "adding multicast group ID" command to the target gateway. The command may include the pair information {bit identifier vector, multicast group ID}. In a second step 634, the gateway forwards the command to all of its cell child nodes (receiving nodes). Such forwarding may be performed in (i) a cell-broadcasting manner or (ii) an individual unicasting manner In a third step 636, upon receipt of the command, the receiving nodes may add the new group ID to the list of the multicast group IDs supported thereby. In addition, the receiving nodes may set the bits pointed to by the bit identifier vectors in the parent-node MGM tables and the child-node MGM tables of the child nodes associated with the receiving nodes, and forward the command to each of the child nodes. Again, the forwarding may be performed in (i) a cell-broadcasting manner or (ii) an individual unicasting manner. Steps 634 and 636 may continue until the command is received by a leaf node (i.e., a node having no child nodes). Once the leaf node is reached, the NMS 212/214 updates the list of multicast group IDs supported by the leaf node (step 638) and sets the bit pointed to by the bit identifier vector in all the child-node MGM tables of the leaf node to be zero ("CLEAR") (step 640). In general, a leaf node has no child-node MGM tables; thus, if a child-node MGM table exists for a leaf node, all the bits of the child-node MGM tables associated therewith are cleared (since the leaf node is not on the path to any multicast groups).

3) Adding a Multicast Group ID to all Nodes in all Gateways of the Wireless Network In various embodiments, steps 632-640 in the approach 630 are sequentially or substantially simultaneously performed for all gateways in the network so as to add a new multicast group ID to all nodes in all gateways of the network.

Removing a Multicast Group ID from a Network

As described above, the NMS 212 may maintain a database storing information, such as the gateway that is the root for a selected network node, the multicast group ID(s) supported by the selected network node, the bit identifier vector(s) corresponding to the supporting multicast group ID(s), etc. The NMS 212 may search and modify information in the database when necessary. In various embodiments, the NMS 212 can remove a multicast group ID from the wireless network it controls. To do so, the NMS 212 may first identify one or more gateways that support the to-be-removed multicast group ID and then perform the following procedures to remove the multicast group ID from (i) a node, (ii) all nodes rooted to the target gateway, and (iii) all network nodes in all gateways of the wireless network.

1) Removing a Multicast Group ID from a Node

Figure 7A:
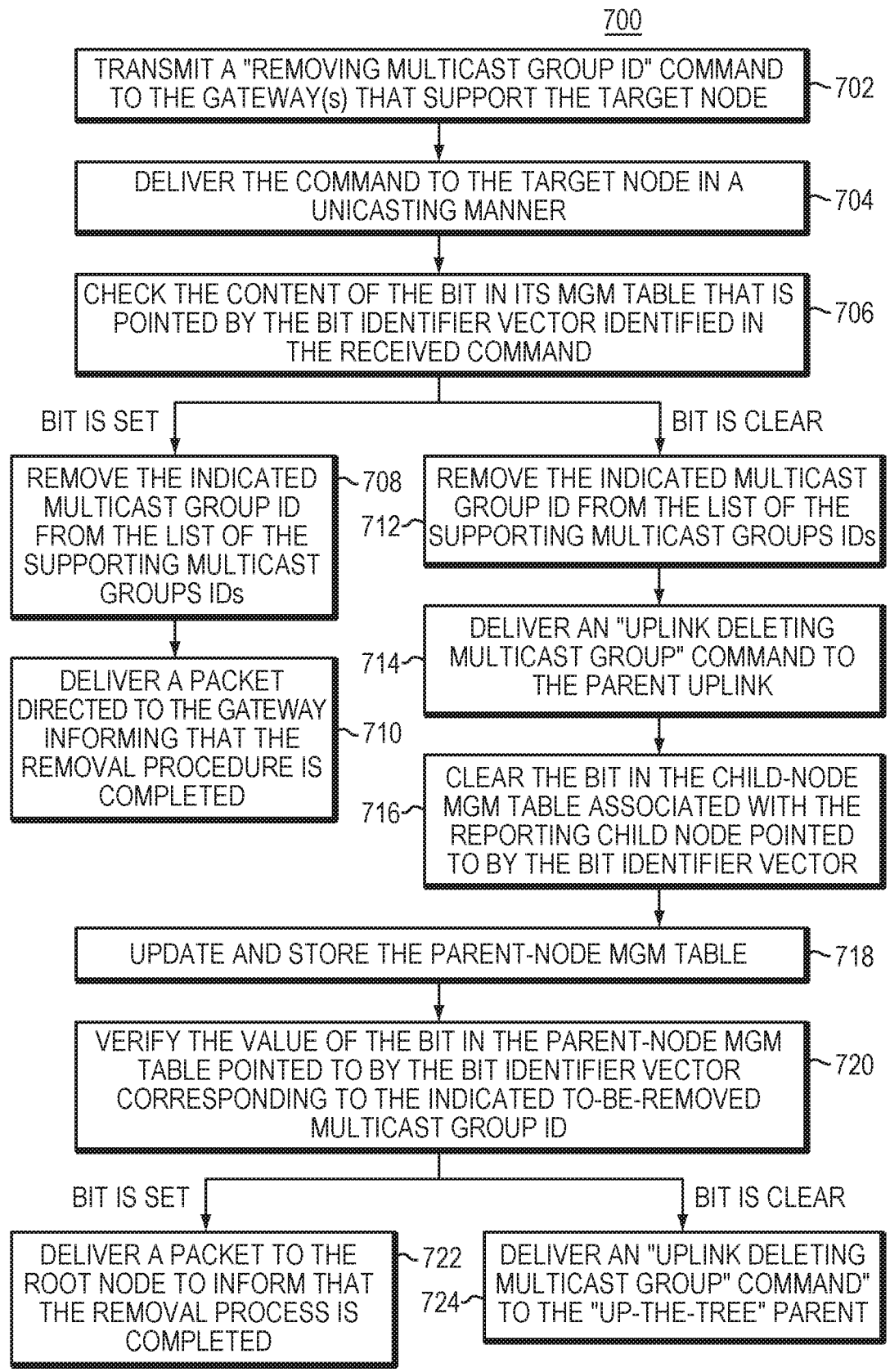
FIG. 7A is a flow chart illustrating an exemplary approach for removing a multicast group ID from a target network node in accordance with various embodiments.

FIG. 7A illustrates an exemplary approach 700 for removing a multicast group ID from a target network node in accordance herewith. In a first step 702, the NMS 212 transmits a "removing multicast group ID" command to a gateway (or, in some embodiments, multiple gateways due to a node transition from one gateway to another) that supports the target node. The command may include the target node ID and the pair information {multicast group ID, corresponding bit identifier vector}. In a second step 704, the gateway(s) delivers the command to the target node in a unicasting manner. In one embodiment, the gateway(s) utilizes the conventional source routing procedures for the unicasting delivery. Note that the removing command may propagate transparently via the path to the target node, and no processing may be performed to the command until it reaches the target node. Once the removing command is received by the target node, the target node may first check the content of the bit in the node MGM table pointed to by the bit identifier vector in the received command (step 706). If the bit is set with a non-zero value ("SET"), one or more of the subtrees associated with the node is on the path to the indicated multicast group ID. Thus, the node may remove the indicated multicast group ID from the list of the multicast groups IDs it supports (step 708) and deliver a packet to the gateway indicating that the removal procedure is complete (step 710). If, however, the bit in the node MGM table pointed to by the bit identifier vector identified in the command is CLEAR (i.e., has a zero value), none of the subtrees associated with this node is on the path to the indicated multicast group ID. Thus, the node removes the indicated multicast group ID from the list of the multicast groups IDs it supports (step 712) and delivers an "uplink deleting multicast group" command to its parent uplink (step 714). In one embodiment, the command includes information such as the multicast group ID, the corresponding bit identifier vector, the address associated with the target node, etc.

In various embodiments, upon receipt of the "uplink deleting multicast group" command from one of its child nodes (or "reporting child node"), the receiving uplink parent node may CLEAR (i.e., set to zero) the bit in the child-node MGM table associated with the reporting child node pointed to by the bit identifier vector (step 716). In addition, the parent may perform a logical OR operation on the bit pointed to by the bit identifier vector on all the child-node MGM tables associated therewith; the resulting value is then stored in its parent-node MGM table (step 718). In one implementation, the parent node verifies the value of the bit in the parent-node MGM table pointed to by the bit identifier vector corresponding to the indicated to-be-removed multicast group ID (step 720). If the bit is SET, the parent node delivers a packet to the gateway indicating that the removal process is complete (step 722). If the bit is CLEAR (which means that the node is not on the path to the indicated to-be-removed multicast group ID), the parent node delivers an "uplink deleting multicast group" command to its "up-the-tree" parent (step 724), which then performs steps 716-724 described above.

2) Removing a Multicast Group ID from all Nodes Rooted to an Identified Gateway

In one embodiment, the approach 700 described above may be performed on all nodes rooted to a target gateway in order to remove the multicast group ID therefrom. This approach, however, may require longer process times and wastes network resources. Alternatively, the target gateway may broadcast the "removing multicast group ID" command, directing each node that receives this broadcast (and supports the to-be-removed multicast group ID) to remove the indicated multicast group ID from its list of the supporting multicast groups. This approach, however, is also inefficient since the broadcast command propagates down the tree structure regardless of whether the traversed nodes are on the path to the indicated to-be-removed multicast group ID.

Figure 7B:
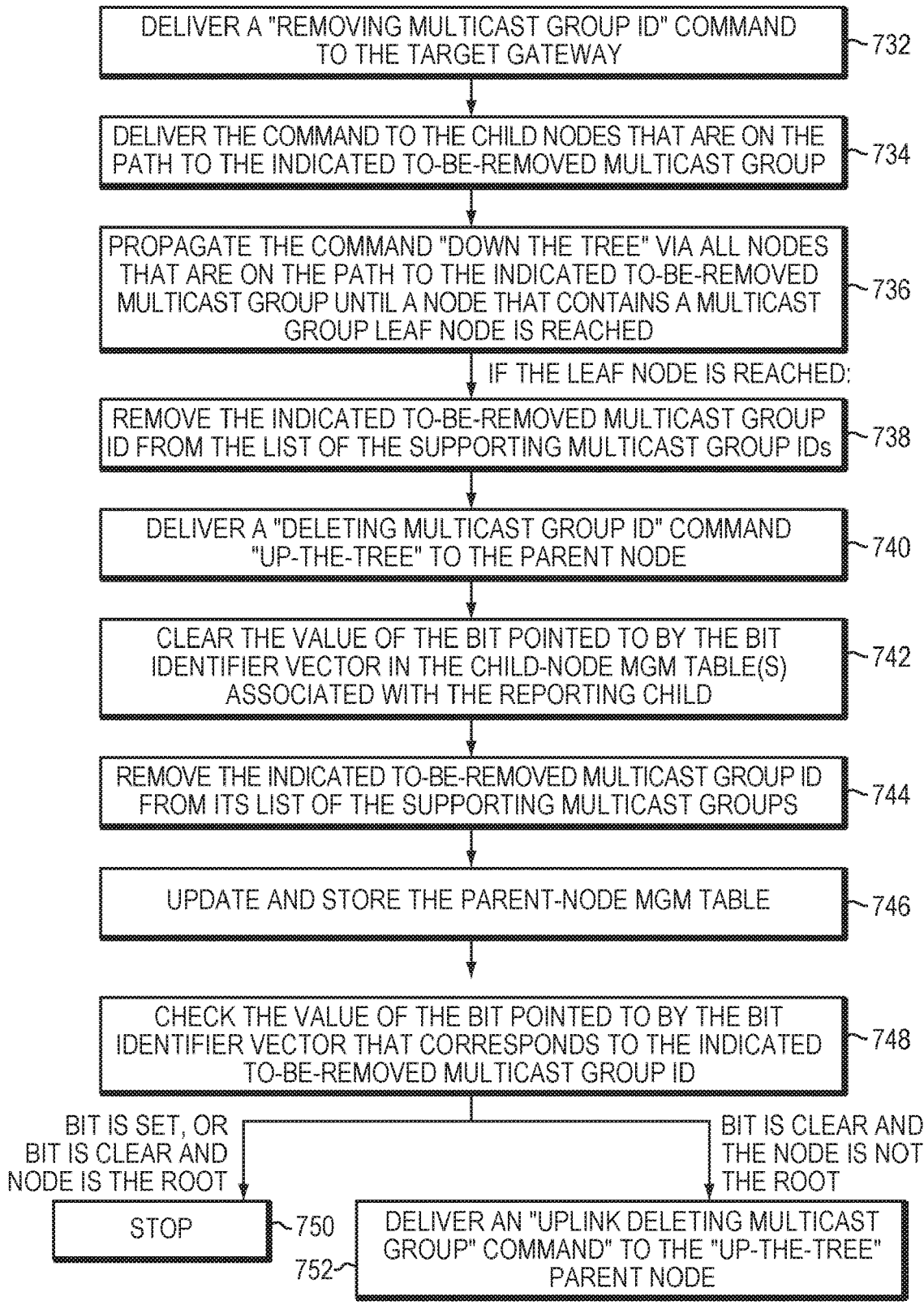
FIG. 7B is a flow chart illustrating an exemplary approach for removing a multicast group ID from all nodes controlled by a target gateway in accordance with various embodiments.

FIG. 7B illustrates an exemplary approach 730 for efficiently removing a multicast group ID from all the nodes controlled by a target gateway (or root node) by propagating the removing command only via nodes that are on the path to the indicated to-be-removed multicast group ID. Typically, a single command is sufficient to remove the to-be-removed multicast group ID from the gateway as well as all nodes supported by the gateway. Again, the removing command may include the multicast group ID that is to be removed and the corresponding bit identifier vector. For clarity, a "multicast group leaf node" meets the following conditions: (i) the value of the bit that corresponds to the indicated to-be-removed multicast group ID in the parent-node MGM table is CLEAR (i.e., this node is not on the path to other nodes supporting the multicast group ID) and (ii) the node supports the to-be-removed multicast group ID. For a given multicast group ID, there may be one or more multicast group leaf nodes.

In a first step 732, the NMS 212 delivers a "removing multicast group ID" command to the target gateway (or root node). In a second step 734, the gateway delivers the command to its child nodes that are on the path to the to-be-removed multicast group (as identified by the child-node MGM tables of the gateway). In a third step 736, the child nodes propagate the command "down the tree" via all nodes that are on the path to the to-be-removed multicast group until a node that contains a multicast group leaf node is reached. In a fourth step 738, after the command reaches the multicast group leaf node, the multicast group leaf node removes the to-be-removed multicast group ID from the list of the multicast group IDs it supports. In addition, the multicast group leaf node delivers a "deleting multicast group ID" command "up-the-tree" to its parent node (step 740). In one embodiment, the command includes the pair information {multicast group ID, bit identifier vector}. The receiving parent node may then CLEAR the value of the bit pointed to by the bit identifier vector in the child-node MGM table(s) associated with the reporting child (step 742). In addition, the parent node may remove the indicated to-be-removed multicast group ID from its list of the supporting multicast groups (step 744). In some embodiments, the parent node performs a logical OR operation on the bit pointed to by the bit identifier vector of the command on all its child-node MGM tables (including that of the reporting child node); the resulting value is then stored in the parent-node MGM table (step 746).

In various embodiments, the parent node checks, in the parent-node MGM table, the value of the bit pointed to by the bit identifier vector that corresponds to the indicated to-be-removed multicast group ID (step 748). If the bit is SET and the node is not the root node, the node is on the path to other members of the to-be-removed group ID that can be identified and processed when their multicast group leaf nodes are reached; thus, the process may be terminated (step 750). Similarly, if the bit is SET and the node is the root node, the root node is on the path to other members of the indicated group ID that can be identified and processed when their multicast group leaf nodes are reached; thus, the process may be terminated here as well (step 750). If, however, the bit is CLEAR and the node is not the root node, the node delivers an "uplink deleting multicast group" command" to its "up-the-tree" parent node (containing the same "uplink deleting multicast group" command received by the parent node from its reporting child) (step 752). In addition, steps 742-752 may be repeated. If the bit is CLEAR and the node is the root node, the removal process is completed and no further processing is necessary (step 750).

3) Removing a Multicast Group ID from all Nodes in all Gateways of the Wireless Network In various embodiments, the NMS delivers the "removing" command as described above to all the gateways that may support the to-be-removed multicast group ID and then performs the approach 730 described above so as to remove the multicast group ID from all nodes in all gateways of the network.

Associating a Node with a New Parent Node

Figure 8:
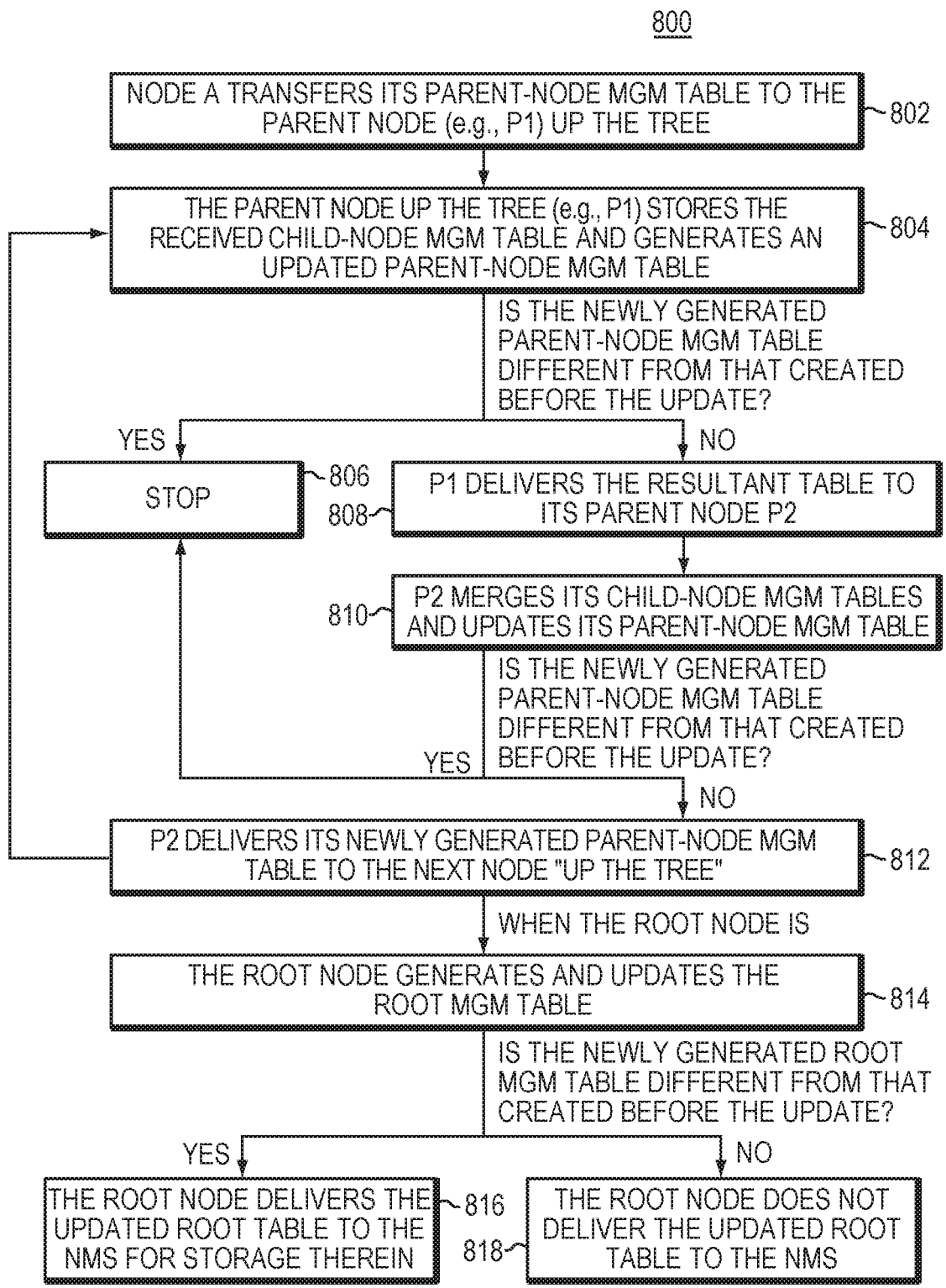
FIG. 8 is a flow chart illustrating an exemplary approach for associating a node with a new parent node in accordance with various embodiments.

FIG. 8 illustrates an exemplary approach 800 for allowing a node, A, that is successfully registered with the NMS 212 to be associated with a new parent node, P1, in accordance with various embodiments, In a first step 802, the node A transfers its parent-node MGM table to the parent node P1. In a second step 804, the parent node P1 stores the received child-node MGM table, and generates an updated parent-node MGM table (e.g., by merging all of its child-node MGM tables). If the newly generated parent-node MGM table is different from the parent-node MGM table created before the update, the process is stopped (step 806); otherwise, the parent node P1 may deliver the resulting table to its parent node, P2 (step 808). When P2 receives from its child node (the node that contains P1) an "updated" child-node MGM table (which already reflects the node A being associated with P1), P2 merges its child-node MGM tables and update its parent-node MGM table (step 810). Again, if the updated parent-node MGM table is different from the parent-node MGM table created prior to the update, the process is stopped (step 806); otherwise, the parent node P2 delivers its newly generated parent-node MGM table to the next node "up the tree" (step 812). Steps 804-812 may be iteratively performed such that the parent-node MGM table can be continuously updated "up the tree" by each receiving parent node (Pi). When the root node eventually receives an updated child-node MGM table from one of its associated child nodes, the root node generates and updates the root MGM table (by, e.g., merging its child-node MGM tables including the newly received child-node MGM table) (step 814). If the newly generated root MGM table is different from that created before the update, the root node delivers the updated root table to the NMS 212 for storage therein (step 816). If, however, the newly generated root MGM table is the same as that created before the update, there is no need for the root node to deliver the updated root table to the NMS (step 818).

It should be noted that the NMS 212 in the approach 800 need not know the specific path to the multicast group supported by each root node. In order to deliver a message to a target multicast group ID, the NMS 212 may have to use only the bit identifier vector corresponding to the target multicast group ID and identify the root MGM table in which this bit is SET. The message can then be delivered by the NMS 212 to those gateways in which the bit is SET. Subsequently, each gateway that receives the message may follow the procedure for multicast group delivery as described above.

In some embodiments, a non-loss compression approach is implemented to save the uplink bandwidth when the MGM table is propagated up the tree to the root node. An exemplary compression scheme takes advantage of the fact that parent-node MGM tables become sparse when going down the tree network. For example, an MGM table can be delivered by rows (i.e., from row 1, row 2, . . . , to the last row); each row contains a bit string from the MGM table.

Delivery of the bit string in each row may be preceded by a one-bit "compression indicator." If the compression indicator is set to zero, all the row bits of this row are CLEAR and are not transmitted. If the compression indicator is set to one, the following row bits represent the actual values of the bits in the current row (some may be CLEAR and some may be SET). As the number of SET bits in an MGM table increases, and depending on the way the SET bits are distributed across the rows in the table, it may be more efficient to deliver the MGM table in its uncompressed format. In one embodiment, the node that delivers the MGM table may determine whether to deliver the table in a compressed or uncompressed format and then inform the target node (up the tree) of the format selection.

De-Associating a Node from its Parent Node

Figure 9:
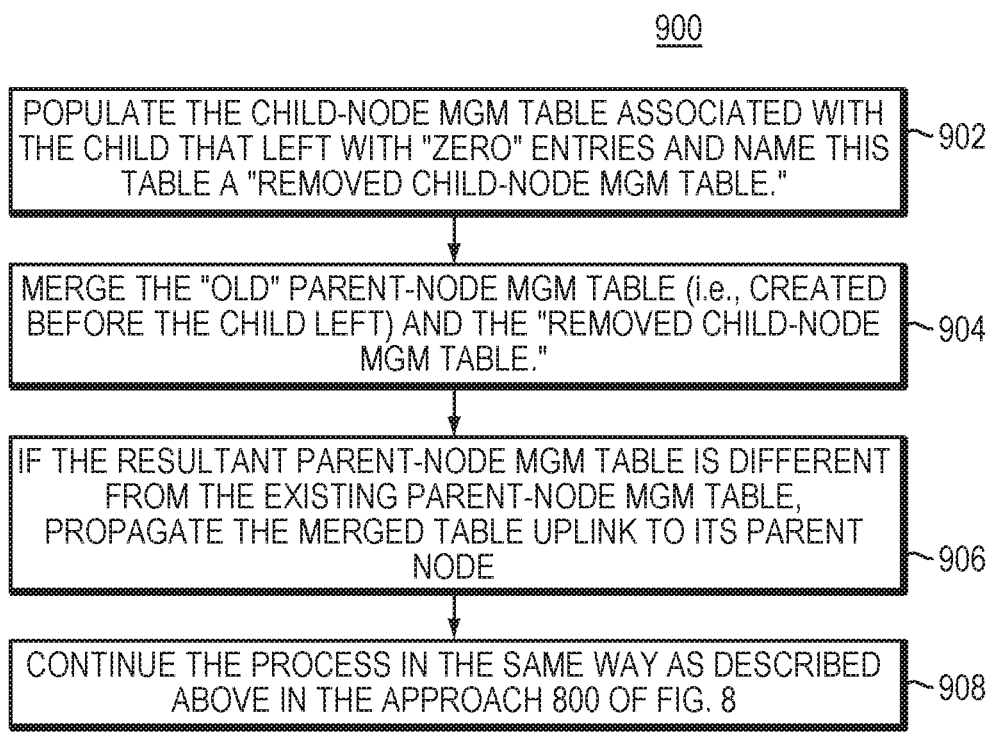
FIG. 9 is a flow chart illustrating an exemplary approach for de-associating a child node from a parent node in accordance with various embodiments.

A child node engaged with a parent node (or "old" parent) that switches to a "new" parent node is actually removed from the old parent node. FIG. 9 illustrates an exemplary approach 900 performed by the old parent after it determines that the child node has left. In a first step 902, the old parent node populates the child-node MGM table associated with the child that left with "zero" entries and name this table a "removed child-node MGM table." In a second step 904, the old parent node merges the "old" parent-node MGM table (i.e., created before the child left) and the "removed child-node MGM table." If the resulting parent-node MGM table is different from the existing parent-node MGM table, the old parent node propagates the merged table uplink to its parent node (step 906). Subsequently, the process continues as described above for the approach 800 (step 908).

Multicast Routing when a Node is in a Transitional State

During transition of a child node (e.g., when the node is associating with a new parent node or leaving an old parent node), the multicast group packet may still be delivered to or via the child node that no longer belongs to the correct multicast path. Two events may then occur: First, the multicast packet may be erroneously delivered to a node that does not support the target multicast group ID; this does not result in any harm as the decision whether to process the multicast packet is made by the application in the receiving node based on the explicit multicast group ID contained in the received packet. Second, the multicast group packet may not reach the target node due to removal of the node (and thereby the multicast path); as a result, the multicast packet may be lost. In various embodiments, when the state of the receiving node is indicated as "in transition," the child-node MGM tables associated therewith are ignored, and the received packet is simply forwarded to all child nodes associated therewith using, for example, the approach described in connection with FIG. 6B (adding a new multicast group ID to a gateway), where all the child nodes are considered to include the path to the target multicast group ID. This approach may effectively minimize (or at least reduce) the number of lost multicast packets during node transitions. In addition, because node transitions typically do not occur frequently, the efficiency and reliability gain using this approach can be significantly larger than the efficiency loss occurring during the actual transition (e.g., due to the unnecessary forwarding of the packet to a child that may not be on the path).

Implement a Unicast Routing Table for Efficient Unicast Delivery

The approaches described above for efficiently delivering a multicast group packet may be implemented to efficiently deliver a unicast packet after a route is established between a network node and the root node (using, e.g., the conventional source routing information for packet delivery). In various embodiments, a unicast routing table associated with each node is created to replace the conventional source routing information; each bit in the unicast routing table may correspond to one child node on the tree. In one implementation, each bit in the unicast routing table corresponds to a unicast child table entry; the content of the pointed-to entry in the unicast child table indicates the number of the child node to which the packet is to be forwarded. The number of each child node may correspond to the MAC address thereof. In addition, a unicast packet may include a bit identifier vector that points to a bit in the unicast routing table.

In various embodiments, after the node receives the packet, the receiving node may determine whether the bit pointed to in the unicast routing table is SET. If so, the receiving node may access the unicast child table, retrieve the child number associated with the entry pointed to by the bit identifier vector, and, based thereon, unicast a MAC frame to the child node. If, however, the bit pointed to in the unicast routing table is CLEAR, the packet has reached the target node. The receiving node may then check the content of the received unicast packet to determine if the indicated target destination address matches the node address. If so, the packet can be processed by the node; otherwise, a routing error is issued.

The approaches for creating the unicast routing tables are similar to those described above for creating the MGM tables. Again, the unicast routing tables may be populated during node association and registration processes. Advantages of using the unicast routing table and unicast child tables include that a packet only has to include the bit identifier vector as the route without having a complete, explicit route required in conventional source routing approaches. In addition, because routing the packet based on the routing tables may result in a shorter packet (since the source routing information is no longer required), the approaches described herein may advantageously save the bandwidth and allow for a larger payload in each delivery.

An Example of Routing a Packet in a Tree-Based Wireless Network Using MGM Tables and Unicast Routing Tables In an example illustrating efficient delivery of a packet in a tree-based wireless network using the MGM tables and unicast routing tables described above, the network is assumed to support 1024 multicast groups; the gateway is assumed to support 4,000 nodes; and each parent node can support up to 16 child nodes (a nibble (four bits) is required in order to represent one of the 16 child nodes). As a result, the string that indicates the route to a unicast target contains 12 bits for the MGM bit position (e.g., 9 bits for the row number and 3 bits for the column number). Thus, $2^9=512$ bytes are required to store a unicast MGM bit map. In addition, because 2,000 bytes are required for the unicast child table (in order to support the 4,000 nibbles), the total storage required for the unicast routing approach is approximately 2,500 bytes only. In addition, the string that indicates the route for a multicast target contains 10 bits for the MGM bit position (e.g., 7 bits for the row number and 3 bits for the column number). Because each node maintains up to 16 child-node MGM tables, $2^7*16=2048$ bytes are required for storage of the MGM tables. In addition, the node maintains $2^7$ bytes for the parent-node MGM table. As a result, the total storage required for the multicast group routing approach is 2176 bytes.

It should be noted that the routing approaches described herein utilize existing tree-based wireless networks without requiring any tree construction or re-construction. The tree structure need not be optimized for a specific multicast group and the same tree structure may be used for all multicast group message deliveries. In addition, although the approaches described herein generally assume that the tree-based wireless network is stable, they can accommodate changes in the tree structure (e.g., caused by self-improving or self-healing procedures) by providing fast changes in the multicast group routing approaches as described above. Further, the terms "gateway" and "root node" are used interchangeably herein.

The NMS 212/214 described herein may include one or more modules implemented in hardware, software, or a combination of both. For embodiments in which the functions are provided as one or more software programs, the programs may be written in any of a number of high level languages such as PYTHON, FORTRAN, PASCAL, JAVA, C, C++, C #, BASIC, various scripting languages, and/or HTML. Additionally, the software can be implemented in an assembly language directed to the microprocessor resident on a target computer; for example, the software may be implemented in Intel 80×86 assembly language if it is configured to run on an IBM PC or PC clone. The software may be embodied on an article of manufacture including, but not limited to, a floppy disk, a jump drive, a hard disk, an optical disk, a magnetic tape, a PROM, an EPROM, EEPROM, field-programmable gate array, or CD-ROM. Embodiments using hardware circuitry may be implemented using, for example, one or more FPGA, CPLD or ASIC processors.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of multicast routing a group packet in a network comprising a plurality of cells each supporting communication among a plurality of transceiver nodes therein and being capable of receiving and transmitting group packets, each cell comprising a parent node and one or more child nodes, each group packet comprising routing information and a payload, the method comprising:
    (a) for each cell, establishing and storing one or more child-node multicast group map tables associated with the one or more child nodes, each of the one or more child-node multicast group map tables comprising (i) an ID associated with at least one multicast group in which the cell is a member and (ii) at least one identifier vector for identifying the at least one multicast group ID in the child-node multicast group map table;
    (b) receiving a multicast group packet whose routing information comprises a target identifier vector and a target multicast group ID;
    (c) determining whether to forward the multicast group packet to the one or more child nodes based at least in part on the one or more child-node multicast group map tables associated therewith and the received target identifier vector;
    (d) when it is determined to forward the multicast group packet to the one or more child nodes, causing the parent node to forward the multicast group packet to the one or more child nodes;
    determining whether the target multicast group ID associated with the group packet matches the at least one multicast group ID in the one or more child-node multicast group map tables; and
    when it is determined that the target multicast group ID associated with the group packet matches the at least one multicast group ID in the one or more child-node multicast group map tables, causing the group packet to be transferred to a higher stack layer within the one or more child nodes.

2. The method of claim 1, wherein the at least one identifier vector points to a bit in the child-node multicast group map table and step (c) comprises determining whether the bit pointed to by the received target identifier vector is set to a non-zero value, and if so, causing the parent node to forward the multicast group packet to the one or more child nodes.

3. The method of claim 1, wherein the one or more child-node multicast group map tables have a size corresponding to a maximum number of the multicast group supported by the network.

4. The method of claim 1, wherein the forwarding step comprises forwarding, by the parent node, the multicast group packet to the one or more child nodes in a broadcasting or multiple unicasting manner.

5. The method of claim 1, further comprising determining a number of the child nodes to which the multicast group packet is forwarded.

6. The method of claim 5, further comprising causing the parent node to forward the multicast group packet in a broadcasting manner if the number of the child nodes to which the multicast group packet is forwarded exceeds one.

7. The method of claim 5, further comprising causing the parent node to forward the multicast group packet in a unicasting manner if the multicast group packet is forwarded to a single child node.

8. A method multicast routing a group packet in a network comprising a plurality of cells each supporting communication among a plurality of transceiver nodes therein and being capable of receiving and transmitting group packets, each cell comprising a parent node and one or more child nodes, each group packet comprising routing information and a payload, the method comprising:
    (a) for each cell, establishing and storing one or more child-node multicast group map tables associated with the one or more child nodes, each of the one or more child-node multicast group map tables comprising (i) an ID associated with at least one multicast group in which the cell is a member and (ii) at least one identifier vector for identifying the at least one multicast group ID in the child-node multicast group map table;
    (b) receiving a multicast group packet whose routing information comprises a target identifier vector and a target multicast group ID;
    (c) determining whether to forward the multicast group packet to the one or more child nodes based at least in part on the one or more child-node multicast group map tables associated therewith and the received target identifier vector;
    (d) when it is determined to forward the multicast group packet to the one or more child nodes, causing the parent node to forward the multicast group packet to the one or more child nodes; and
    establishing and storing a parent-node multicast group map table associated with the parent node, the parent-node multicast group map table comprising (i) an ID associated with each multicast group IDs supported by all of the one or more child nodes of the parent node and subtrees associated therewith and (ii) at least one identifier vector merging the identifier vectors associated with all of the one or more child nodes of the parent node.

9. The method of claim 8, wherein the parent-node multicast group map table is established by applying a bitwise OR operation on the one or more child-node multicast group map tables of the child nodes of the parent node.

10. The method of claim 8, further comprising:
determining whether the target multicast group ID associated with the group packet matches the at least one multicast group ID in the one or more child-node multicast group map tables; and
when it is determined that the target multicast group ID associated with the group packet matches the at least one multicast group ID in the one or more child-node multicast group map tables, causing the group packet to be transferred to a higher stack layer within the one or more child nodes.

11. A network system for multicast routing a group packet in a network comprising a plurality of cells each supporting communication among a plurality of transceiver nodes therein and being capable of receiving and transmitting group packets, each cell comprising a parent node and one or more child nodes, each group packet comprising routing information and a payload, the system comprising:
memory for storing one or more child-node multicast group map tables associated with the one or more child nodes, each of the one or more child-node multicast group map tables comprising (i) an ID associated with at least one multicast group and (ii) at least one identifier vector for identifying the at least one multicast group ID in the child-node multicast group map table; and
a plurality of network management systems associated with the network system and each of the transceiver nodes,
wherein the network management system associated with the network system is configured to receive a multicast group packet whose routing information comprises a target identifier vector and a target multicast group ID; and the network management system associated with each of the nodes is configured to (i) determine whether to forward the multicast group packet to the one or more child nodes based at least in part on the one or more child-node multicast group map tables associated therewith and the received target identifier vector; (ii) when it is determined to forward the multicast group packet to the one or more child nodes, cause the parent node to forward the multicast group packet to the one or more child nodes, (iii) determine whether the target multicast group ID associated with the group packet matches the at least one multicast group ID in the one or more child-node multicast group map tables, and (iv) when it is determined that the target multicast group ID associated with the group packet matches the at least one multicast group ID in the one or more child-node multicast group map tables, cause the group packet to be transferred to a higher stack layer within the one or more child nodes.

12. The system of claim 11, wherein the at least one identifier vector points to a bit in the child-node multicast group map table and the network management system associated with each node is further configured to determine whether the bit pointed to by the received target identifier vector is set to a non-zero value, and if so, cause the parent node to forward the multicast group packet to the one or more child nodes.

13. The system of claim 11, wherein the one or more child-node multicast group map tables have a size corresponding to a maximum number of the multicast group supported by the network.

14. The system of claim 11, wherein the network management system associated with each node is further configured to forward, by the parent node, the multicast group packet to the one or more child nodes in a broadcasting or multiple unicasting manner.

15. The system of claim 11, wherein the network management system associated with each node is further configured to determine a number of the child nodes to which the multicast group packet is forwarded.

16. The system of claim 15, wherein the network management system associated with each node is further configured to cause the parent node to forward the multicast group packet in a broadcasting manner if the number of the child nodes to which the multicast group packet is forwarded exceeds one.

17. The system of claim 15, wherein the network management system associated with each node is further configured to cause the parent node to forward the multicast group packet in a unicasting manner if the multicast group packet is forwarded to a single child node.

18. A network system for multicast routing a group packet in a network comprising a plurality of cells each supporting communication among a plurality of transceiver nodes therein and being capable of receiving and transmitting group packets, each cell comprising a parent node and one or more child nodes, each group packet comprising routing information and a payload, the system comprising:
memory for storing one or more child-node multicast group map tables associated with the one or more child nodes, each of the one or more child-node multicast group map tables comprising (i) an ID associated with at least one multicast group and (ii) at least one identifier vector for identifying the at least one multicast group ID in the child-node multicast group map table; and
a plurality of network management systems associated with the network system and each of the transceiver nodes,
wherein the network management system associated with the network system is configured to receive a multicast group packet whose routing information comprises a target identifier vector and a target multicast group ID; and the network management system associated with each of the nodes is configured to (A) determine whether to forward the multicast group packet to the one or more child nodes based at least in part on the one or more child-node multicast group map tables associated therewith and the received target identifier vector; (B) when it is determined to forward the multicast group packet to the one or more child nodes, cause the parent node to forward the multicast group packet to the one or more child nodes, (C) establish a parent-node multicast group map table associated with the parent node, the parent-node multicast group map table comprising (i) an ID associated with each multicast group IDs supported by all of the one or more child nodes of the parent node and subtrees associated therewith and (ii) at least one identifier vector merging the identifier vectors associated with all of the one or more child nodes of the parent node, and (D) store the parent-node multicast group map in the memory.

19. The system of claim 18, wherein the network management system associated with each node is further configured to establish the parent-node multicast group map table by applying a bitwise OR operation on the one or more child-node multicast group map tables of the child nodes of the parent node.

20. The system of claim 18, wherein the network management system associated with each node is further configured to:
   determine whether the target multicast group ID associated with the group packet matches the at least one multicast group ID in the one or more child-node multicast group map tables; and
   when it is determined that the target multicast group ID associated with the group packet matches the at least one multicast group ID in the one or more child-node multicast group map tables, cause the group packet to be transferred to a higher stack layer within the one or more child nodes.

\* \* \* \* \*